US012587975B2

(12) United States Patent
Nimbalker et al.

(10) Patent No.: US 12,587,975 B2
(45) Date of Patent: Mar. 24, 2026

(54) HANDLING A POWER OF TRANSMISSION AND TIME OFFSET FOR FIRST AND SECOND CELL GROUPS IN DUAL CONNECTIVITY

(71) Applicant: Telefonaktiebolaget LM Ericsson (publ), Stockholm (SE)

(72) Inventors: Ajit Nimbalker, Fremont, CA (US); Ravikiran Nory, San José, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 540 days.

(21) Appl. No.: 17/912,624

(22) PCT Filed: May 8, 2020

(86) PCT No.: PCT/EP2020/062824
§ 371 (c)(1),
(2) Date: Sep. 19, 2022

(87) PCT Pub. No.: WO2021/204405
PCT Pub. Date: Oct. 14, 2021

(65) Prior Publication Data
US 2023/0189167 A1 Jun. 15, 2023

Related U.S. Application Data

(60) Provisional application No. 63/007,491, filed on Apr. 9, 2020.

(51) Int. Cl.
*H04W 52/36* (2009.01)
*H04B 7/06* (2006.01)
(Continued)

(52) U.S. Cl.
CPC ........ *H04W 52/367* (2013.01); *H04B 7/0626* (2013.01); *H04W 52/146* (2013.01); *H04W 76/15* (2018.02)

(58) Field of Classification Search
CPC . H04W 52/367; H04W 52/146; H04W 76/15; H04W 52/50; H04W 72/0473;
(Continued)

(56) References Cited

U.S. PATENT DOCUMENTS

| | | | |
|---|---|---|---|
| 10,028,232 | B2 | 7/2018 | Hwang et al. |
| 10,485,048 | B2 | 11/2019 | Zeng et al. |

(Continued)

FOREIGN PATENT DOCUMENTS

| | | |
|---|---|---|
| CN | 107113740 A | 8/2017 |
| CN | 109151931 A | 1/2019 |

(Continued)

OTHER PUBLICATIONS

Chinese Notice of Allowance for Chinese Patent Application No. 202080099513.6, 8 pages (including English translation of search report).
(Continued)

*Primary Examiner* — Lana N Le
(74) *Attorney, Agent, or Firm* — Sage Patent Group

(57) ABSTRACT
A method performed by a wireless device configured with dual connectivity between a first group of cells and a second group of cells is provided. The method includes determining a limit of a power of transmission of a first uplink transmission in the first group of cells. The limit is determined based on detection, before a time offset in relation to a beginning of a time of transmission of the first uplink transmission, of a downlink grant or assignment that triggers the second uplink transmission in the second group of cells overlapping in time with the first uplink transmission. The method further includes setting the power of transmission for the first uplink transmission based on the limit. Methods performed by a first network node and/or a second network node are also provided.

8 Claims, 15 Drawing Sheets

203

Determine a limit of a power of transmission of a first uplink transmission in the first group of cells, wherein the limit is determined based on a detection, before a time offset in relation to a beginning of a time of transmission of the first uplink transmission, of a downlink grant or assignment that triggers the second uplink transmission

204

Set the power of transmission for the first uplink transmission based on the limit

(51) Int. Cl.
    *H04W 52/14*      (2009.01)
    *H04W 76/15*      (2018.01)

(58) Field of Classification Search
    CPC ..... H04W 52/346; H04W 8/22; H04W 52/36;
                  H04W 52/54; H04W 72/20; H04W
                72/044; H04W 52/30; H04W 88/06;
           H04W 72/21; H04W 52/34; H04W 52/04;
           H04W 52/0209; H04W 52/0274; H04W
           52/0206; H04W 72/23; H04B 7/0626;
                  H04L 41/08; H04L 41/0803
    See application file for complete search history.

(56)           References Cited

U.S. PATENT DOCUMENTS

| | | | |
|---|---|---|---|
| 10,959,189 B2 | 3/2021 | Blankenship et al. | |
| 2014/0127991 A1* | 5/2014 | Lim | H04W 8/22 |
| | | | 455/39 |
| 2015/0271761 A1* | 9/2015 | Park | H04W 52/367 |
| 2015/0282103 A1* | 10/2015 | Immonen | H04W 52/146 |
| 2017/0325176 A1* | 11/2017 | Hwang | H04W 52/34 |
| 2019/0320379 A1 | 10/2019 | Dinan | |
| 2020/0053657 A1 | 2/2020 | Molavianjazi et al. | |
| 2020/0068504 A1 | 2/2020 | Yi et al. | |
| 2021/0258891 A1* | 8/2021 | Papasakellariou | H04W 52/36 |
| 2021/0337427 A1* | 10/2021 | Takeda | H04W 52/146 |
| 2022/0201679 A1* | 6/2022 | Lim | H04W 72/20 |
| 2022/0312342 A1* | 9/2022 | Cha | H04W 52/36 |
| 2022/0330251 A1* | 10/2022 | Xu | H04W 72/20 |
| 2023/0013332 A1 | 1/2023 | Pu et al. | |
| 2024/0137970 A1* | 4/2024 | Rastegardoost | H04W 52/367 |
| 2024/0284274 A1* | 8/2024 | Park | H04W 76/15 |

FOREIGN PATENT DOCUMENTS

| | | | |
|---|---|---|---|
| CN | 110381575 A | 10/2019 | |
| EP | 4132123 A1 | 2/2023 | |
| WO | 2015139224 A1 | 9/2015 | |
| WO | 2016091276 A1 | 6/2016 | |
| WO | 2018084797 A1 | 5/2018 | |
| WO | 2019032038 A1 | 2/2019 | |
| WO | 2020030555 A1 | 2/2020 | |
| WO | 2020064698 A1 | 4/2020 | |
| WO | 2020201119 A2 | 10/2020 | |
| WO | 2021197193 A1 | 10/2021 | |

OTHER PUBLICATIONS

Nokia et al., "Uplink PC for NR-NR Dual Connectivity," 3GPP TSG RAN WG1 #98bis, R1-1910607, Chongqing, China, Oct. 14-20, 2019, 4 pages.

Cheng, Nan et al, "Analysis of LTE Network Coverage Optimization", vol. 7, Telecom Engineering Technics and Standardization, vol. 7, Jul. 11, 2018, 5 pages (includes English translation of abstract).

Extended European Search Report for European Patent Application No. 23178871.2 dated Nov. 28, 2023, 17 pages.

Office Action for Japanese Patent Application No. 2022-554695 dated Jun. 9, 2023, 2 pages.

Office Action for Japanese Patent Application No. 2023-196095 dated Jan. 17, 2025, 3 pages.

"LS on uplink power control for NR-NR Dual-Connectivity," R1-2001421, 3GPP TSG-RAN WG1 Meeting #100, Online meeting, Apr. 20-30, 2020, 2 pages.

International Search Report and Written Opinion of the International Searching Authority for PCT International Application No. PCT/EP2020/062824 dated Jan. 18, 2021.

Apple Inc., "Feature lead summary #3 for uplink power control for NR-NR DC," R1-1913550, 3GPP TSG-RAN WG1 #99, Reno, USA, Nov. 18-22, 2019, 14 pages.

ZTE Corporation, "Discussion on uplink power control for NR-DC," R1-1910107, 3GPP TSG RAN WG1 Meeting #98bis, Chongqing, China, Oct. 14-20, 2019, 5 pages.

3GPP TS 38.213 V16.0.0, "3rd Generation Partnership Project; Technical Specification Group Radio Access Network; NR; Physical layer procedures for control (Release 16)," Dec. 2019, 146 pages.

* cited by examiner

100

Figure 2:
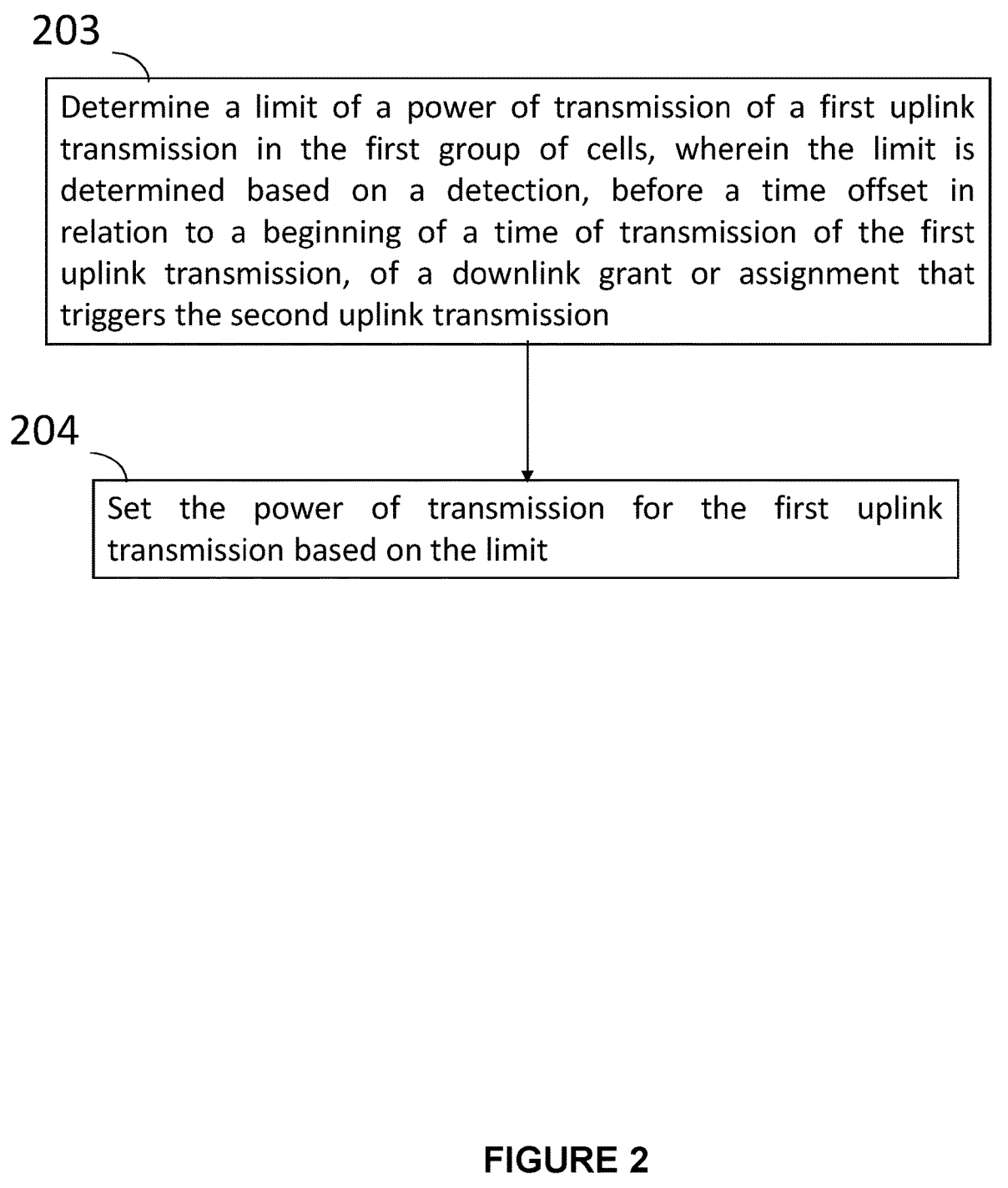

203

Determine a limit of a power of transmission of a first uplink transmission in the first group of cells, wherein the limit is determined based on a detection, before a time offset in relation to a beginning of a time of transmission of the first uplink transmission, of a downlink grant or assignment that triggers the second uplink transmission

204

Set the power of transmission for the first uplink transmission based on the limit

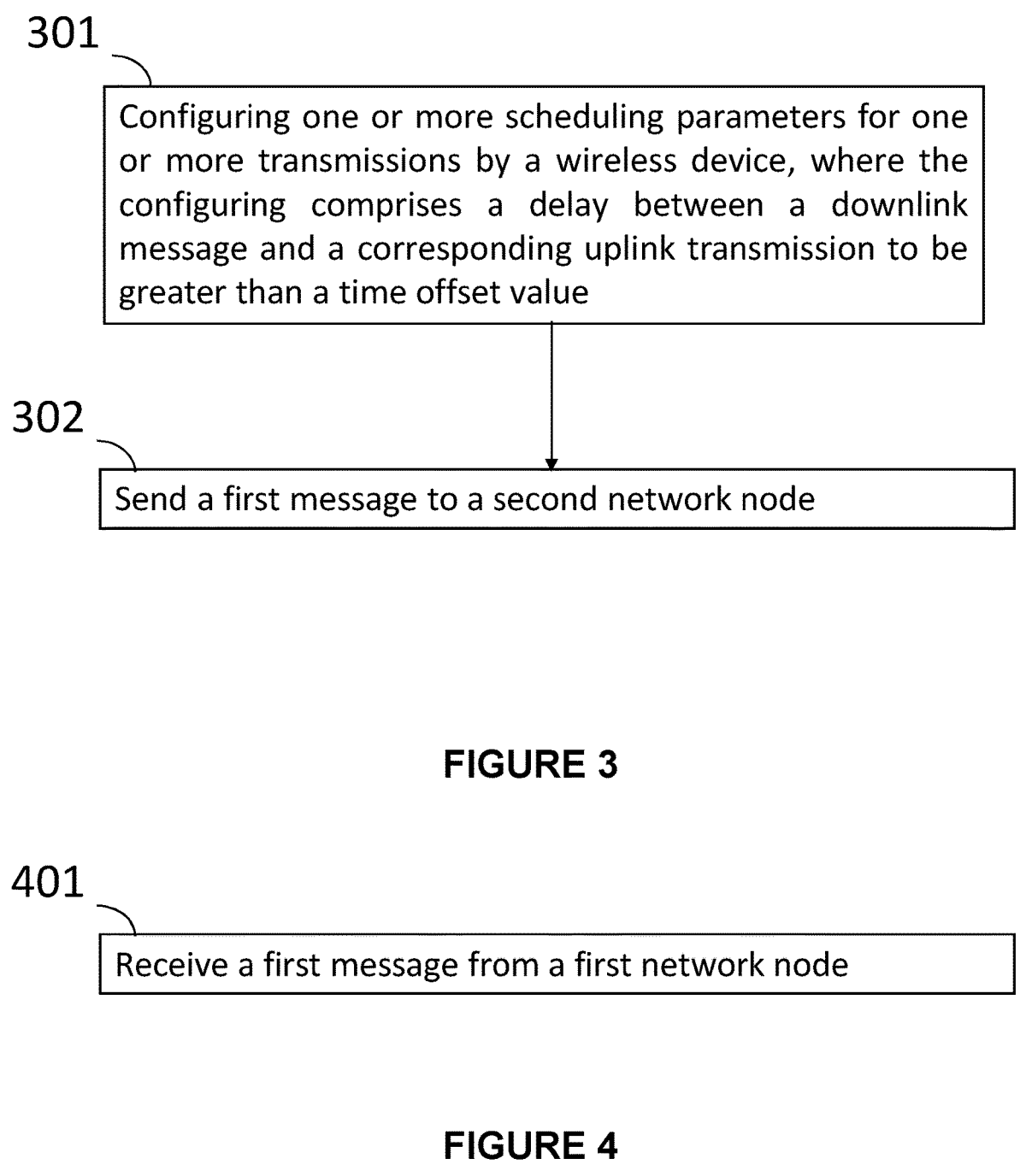

> Configuring one or more scheduling parameters for one or more transmissions by a wireless device, where the configuring comprises a delay between a downlink message and a corresponding uplink transmission to be greater than a time offset value

302

> Send a first message to a second network node

> Receive a first message from a first network node

FIGURE 4

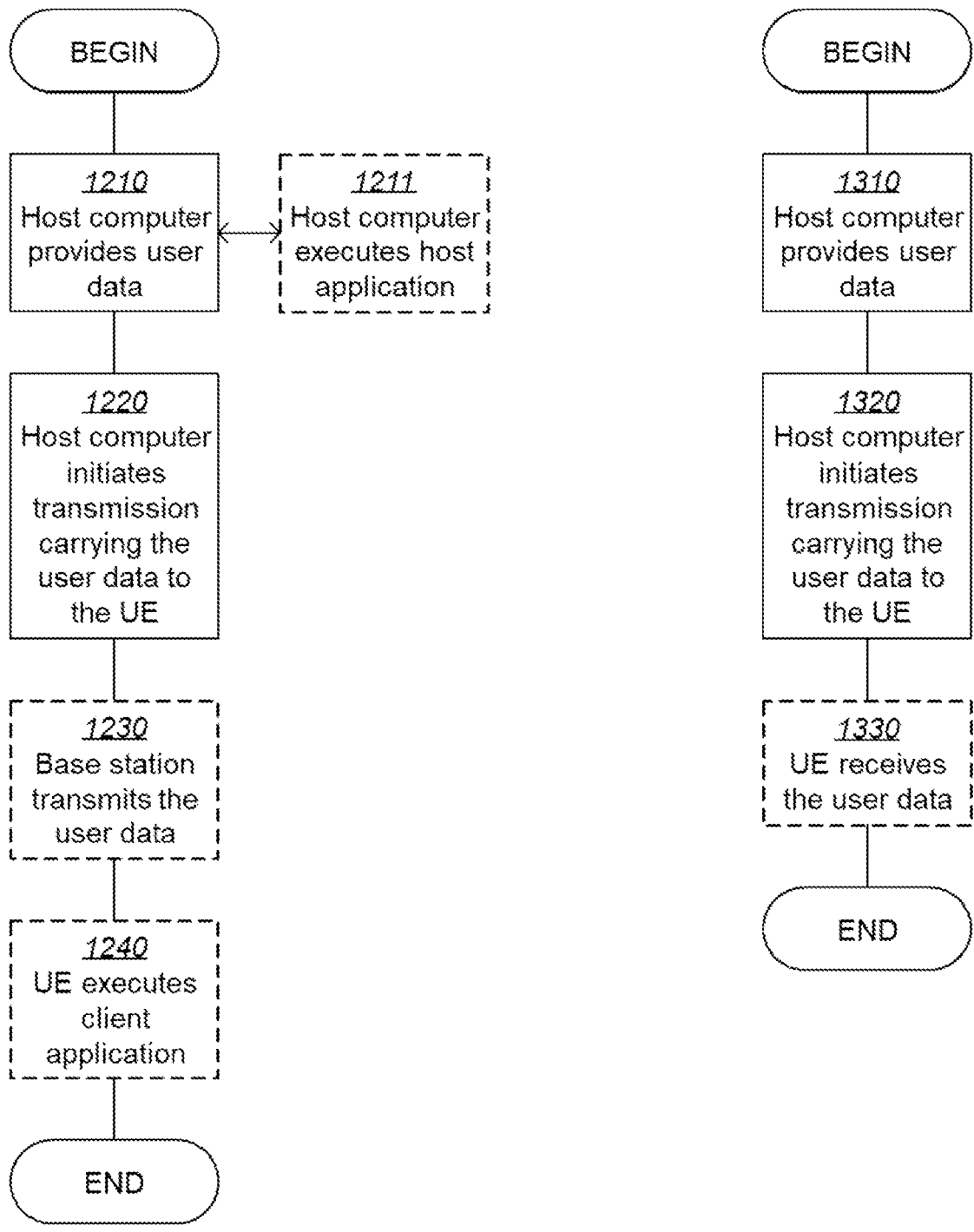
FIGURE 12                                        FIGURE 13

HANDLING A POWER OF TRANSMISSION AND TIME OFFSET FOR FIRST AND SECOND CELL GROUPS IN DUAL CONNECTIVITY

CROSS REFERENCE TO RELATED APPLICATIONS

This application is a 35 U.S.C. § 371 national stage application of PCT International Application No. PCT/EP2020/062824 filed on May 8, 2020, which claims the benefit of U.S. Provisional Patent Application Ser. No. 63/007,491, filed on Apr. 9, 2020, the disclosures and content of which are incorporated by reference herein in their entireties.

TECHNICAL FIELD

The present disclosure relates generally to wireless communications systems and, more particularly, to wireless devices, network nodes, and methods performed thereby for handling a power of transmission and a time offset.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., evolved Node B ("eNB"), "eNodeB", "NodeB", "B node", gNB, Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Multi-Carrier Operation Will Now be Described.

In multicarrier or carrier aggregation (CA) operation, a UE may be able to receive and/or transmit data to more than one serving cell. In other words, a CA capable UE may be configured to operate with more than one serving cell. The carrier of each serving cell may be generally called as a component carrier (CC). In simple words, the component carrier (CC) may be understood to mean an individual carrier in a multi-carrier system. The term carrier aggregation (CA) may be also called, e.g., interchangeably called, "multi-carrier system", "multi-cell operation", "multi-carrier operation", "multi-carrier" transmission and/or reception. This may be understood to mean the CA may be used for transmission of signaling and data in the uplink and downlink directions. One of the CCs is the primary component carrier (PCC), or simply primary carrier, or even anchor carrier. The remaining ones may be called secondary component carrier (SCC), or simply secondary carriers, or even supplementary carriers. The serving cell may be interchangeably called as primary cell (PCell) or primary serving cell (PSC). Similarly, the secondary serving cell may be interchangeably called as secondary cell (SCell) or secondary serving cell (SSC).

Generally, the primary or anchor CC may carry the UE specific signalling that the UE may need. The primary CC, a.k.a. PCC or PCell, may exist in both uplink and downlink directions in CA. In case there is single UL CC, the PCell may be on that CC. The network may assign different primary carriers to different UEs operating in the same sector or cell.

In Dual Connectivity (DC) operation, the UE may be served by at least two nodes called master eNB (MeNB) and secondary eNB (SeNB). More generally, in multiple connectivity, a.k.a., multi-connectivity, operation, the UE may be served by two or more nodes where each node may operate or manages one cell group, e.g., MeNB, SeNB1, SeNB2 and so on. More specifically, in multi-connectivity, each node may serve or manage at least secondary serving cells belonging its own cell group. Each cell group may contain one or more serving cells. The UE may be configured with PCC from both MeNB and SeNB. The PCell from MeNB and SeNB may be called as PCell and PSCell, respectively. The UE may also be configured with one or more SCCs from each of MeNB and SeNB. The corresponding secondary serving cells served by MeNB and SeNB may be called SCells. The UE in DC may typically have separate Transmitter/Receiver (TX/RX) for each of the connections with MeNB and SeNB. This may allow the MeNB and SeNB to independently configure the UE with one or more procedures e.g., radio link monitoring (RLM), Discontinued Reception (DRX) cycle etc. on their PCell and PSCell respectively.

In multiconnectivity, all cell groups may contain serving cells of the same Radio Access Technology (RAT), e.g., LTE, or different cell groups may contain serving cells of different RATs.

Dual Connectivity Will Now be Described.

Evolved Universal Terrestrial Radio Access Network (E-UTRAN) may support Dual Connectivity (DC) operation, whereby a multiple Rx/Tx UE in RRC_CONNECTED may be configured to utilize radio resources provided by two distinct schedulers, located in two eNBs connected via a non-ideal backhaul over the X2 interface (see 3GPP 36.300). DC operation may be understood to advantageously provide data aggregation by using more than one link, as well as link diversity for robustness. eNBs involved in DC for a certain UE may assume two different roles: an eNB may either act as a Master node (MN) or as a Secondary node (SN). In DC, an MN may be understood, for example, as a radio network node which may terminate at least an interface between the radio network node and a Mobility Management Entity (MME). Such an interface may be, for example, an S1 control plane interface between an eNB and an MME (S1-MME). In DC, an SN may be understood as a radio network node that may be providing additional radio resources for a UE, but is not the MN. In DC, a UE may be connected to one MN and one SN.

Dual connectivity (DC) may generally be used in NR (5G) and LTE systems to improve UE transmit and receive data rate. With dual connectivity, the UE typically may operate initially a serving cell group called a master cell group (MCG). The UE may then be configured by the network with an additional cell group called a secondary cell group (SCG). Each cell group (CG) may have one or more serving cells. MCG and SCG may be operated from geographically non-collocated gNBs.

SUMMARY

According to various embodiments of inventive concepts, a method performed by a wireless device configured with dual connectivity between a first group of cells and a second group of cells is provided. The method includes determining a limit of a power of transmission of a first uplink transmission in the first group of cells. The limit is determined based on a detection, before a time offset in relation to a beginning of a time of transmission of the first uplink transmission, of a downlink grant or assignment that triggers the second uplink transmission in the second group of cells overlapping in time with the first uplink transmission. The method further includes setting the power of transmission for the first uplink transmission based on the limit.

Corresponding embodiments of inventive concepts for a wireless device, computer products, and computer programs are also provided.

According to other embodiments of inventive concepts, a method performed by a first network node serving a first group of cells in a dual connectivity configuration in a communications network is provided. The method includes configuring one or more scheduling parameters for one or more transmissions by a wireless device. The configuring includes a delay between a downlink message and a corresponding uplink transmission to be greater than a time offset value. The method further includes sending a first message to a second network node. The first message includes an indication of the configured one or more scheduling parameters.

Corresponding embodiments of inventive concepts for a first network node, computer products, and computer programs are also provided.

According to other embodiments of inventive concepts, a method performed by a second network node serving a wireless device using a second group of cells in a dual connectivity configuration in a communications network is provided. The method includes receiving a first message from a first network node. The first message includes an indication of one or more scheduling parameters configured by the first network node for one or more transmissions by the wireless device. The one of more scheduling parameters include a delay between a downlink message and a corresponding uplink transmission where the delay is greater than a time offset value.

Corresponding embodiments of inventive concepts for a second network node, computer products, and computer programs are also provided.

Existing DC methods may lead to suboptimal performance of a network due to low coverage and data rate, for example, where the overlapping MCG transmission is scheduled before T-T_offset but the power setting for the MCG transmission is determined/adjusted by a subsequent message that comes after T-T_offset. This requires SCG transmission power setting to be adjusted accordingly. Such scenarios can for example occur during configured grant or SPS UL scheduling. There is a need to avoid such scenarios that needs changing overlapping MCG transmission's power setting after T-T_offset.

Various embodiments of the present disclosure may provide solutions to these and other potential problems. In various embodiments of the present disclosure, a wireless device and a network node(s) operation to provide a method for power sharing for New Radio-Dual Connectivity. For example, the operations may allow the wireless device to indicate an capability, e.g. an advanced capability, that results in a shorter time offset and hence latency may be reduced because the master cell group, MCG, may schedule uplink with shorter delay. This improves overall system performance. In other embodiments, the operations reduce wireless device complexity by not requiring that the wireless device has adjust the power setting of an MCG transmission occurring after time offset. For example, the operations may allow a wireless device to go to full power on a first cell group based on the presence/absence of transmission activity on a second cell group. As a consequence, system performance may be improved by improving coverage and data rate.

BRIEF DESCRIPTION OF THE DRAWINGS

Examples of embodiments herein are described in more detail with reference to the accompanying drawings, according to the following description.

FIG. 2 is a flowchart depicting a method in a wireless device, according to embodiments herein.

FIG. 3 is a flowchart depicting a method in a first network node, according to embodiments herein.

FIG. 4 is a flowchart depicting a method in a second network node, according to embodiments herein.

FIG. 12 is a flowchart depicting embodiments of a method in a communications system including a host computer, a base station and a user equipment, according to embodiments herein.

FIG. 13 is a flowchart depicting embodiments of a method in a communications system including a host computer, a base station and a user equipment, according to embodiments herein.

DETAILED DESCRIPTION

Figure 1:
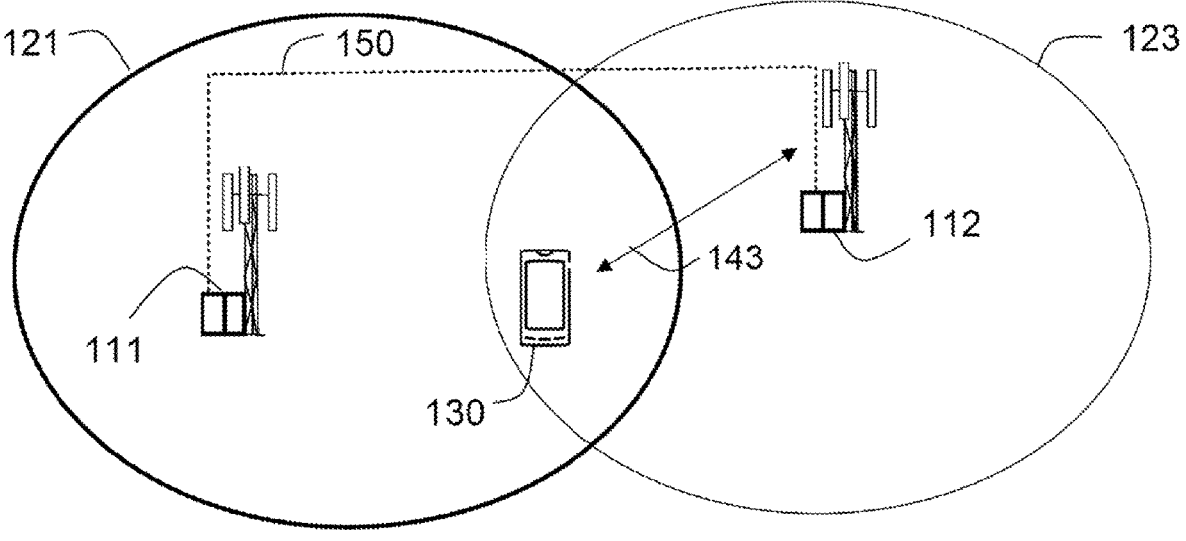
FIG. 1 is a schematic diagram an example of a wireless communications network, according to embodiments herein.

As part of the development of embodiments herein, one or more challenges with the existing technology will first be identified and discussed.

For dual connectivity, the UE may need to perform UL transmissions across both MCG and SCG. Since MCG and SCG may not be co-located or because the implementation may not allow for close coordination of schedulers between the cell groups, the scheduling decisions by the NW for such uplink transmissions may not be fully coordinated, and the UE may need to use power sharing mechanisms to distribute the transmission power across CGs. The simplest power sharing mechanism is one where the UE may use predetermined power limits to transmit on MCG and SCG regardless of transmission activity on the other CG. This is suboptimal, as the predetermined power limits will be smaller than full UL power with which the UE may transmit.

Certain aspects of the present disclosure and their embodiments may provide solutions to these or other challenges. Embodiments herein may be generally understood to address that there may be a need for mechanisms that may allow a UE to go to full power on a CG based on the presence/absence of transmission activity on the other CG. Such mechanisms may improve system performance by improving coverage and data rate. Embodiments herein may be generally understood to relate to power sharing for NR-DC.

Embodiments herein may also be generally understood to provide mechanisms for determining UE transmit power when configured with NR-NR dual connectivity. An approach is described herein where the UE may determine a transmission power for a first uplink transmission on a first cell group by using a power limit. If the UE detects scheduling grants/assignments triggering an overlapping second uplink transmission in a second cell group, the UE may set a lower power limit for the first UL transmission. If such a scheduling grant/assignment is not detected, the UE may set higher power limit, e.g., full power, for the first UL transmission. The UE may also set a lower power limit if determines that there may be a potential overlapping uplink transmission in the second cell group. The same procedure may be followed for the other cell group.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

FIG. 1 depicts a non-limiting example of a wireless network or wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may also support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, GSM network, GERAN network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system.

The wireless communications network 100 comprises a plurality of network nodes, whereof a first network node 111 and a second network node 112 are depicted in the non-limiting example of FIG. 1. In other examples, which are not depicted in FIG. 1, any of the first network node 111 and the second network node 112 may be a distributed node, such as a virtual node in the cloud, and may perform its functions entirely on the cloud, or partially, in collaboration with a radio network node. The expression "a network node 111, 112" may be used herein to refer to any of the first network node 111 and the second network node 112.

Each of the first network node 111 and the second network node 112 may be understood to be a radio network node. That is, a transmission point such as a radio base station, for example a gNB, an eNB, or any other network node with similar features capable of serving a wireless device, such as a user equipment or a machine type communication device, in the wireless communications network 100.

The wireless communications network 100 covers a geographical area which may be divided into cell areas, wherein each cell area may be served by a network node, although, one radio network node may serve one or several cells. The wireless communications network 100 may comprise at least one of: a first group of cells 121 and a second group of cells 123. The first group of cells 121 may be, for example, a MCG. The second group of cells 123 may be, for example, a SCG. The first group of cells 121 may comprise a first cell, and one or more second cells. That is, each of the first group of cells 121 and the second group of cells may comprise one or more cells. In the non-limiting example depicted FIG. 1, only the first cell is depicted to simplify the Figure. The first cell maybe a primary cell (PCell) and each of the one or more second cells may be a secondary cell (SCell). In the non-limiting example depicted in FIG. 1, the first network node 111 is a radio network node that serves the first cell. The first network node 111 may, in some examples, serve receiving nodes, such as wireless devices, with serving beams.

The second group of cells 123 may comprise a third cell, and one or more fourth cells. In the non-limiting examples depicted in FIG. 1, only the third cell is depicted to simplify the Figure. The third cell maybe a primary secondary cell (PSCell) and each of the one or more fourth cells may be a secondary cell (SCell). In the non-limiting example depicted in FIG. 1, the second network node 112 is a radio network node that serves the third cell. The second network node 112 may serve receiving nodes, such as wireless devices, with serving beams.

The first network node 111, in some examples, may be a MN.

The second network node 112, in some examples, may be a SN.

In some examples, both of the first network node 111 and the second network node 112 may each be a gNB.

In LTE, any of the first network node 111 and the second network node 112 may be referred to as an eNB. In some examples, the first network node 111 may be an eNB as MN, and the second network node 112 may be a gNB as SN. It may be noted that although the description of embodiments herein may focus on the LTE-NR tight interworking case, where the LTE is the master node, embodiments herein may be understood to also be applicable to other DC cases, such as LTE-NR DC, where NR is the master and LTE is the secondary node (NE-DC), NR-NR DC, where both the master and secondary nodes are NR nodes, or even between LTE/NR and other RATs. In some examples, the first network node 111 may be a gNB as MN, and the second network node 112 may be an eNB as SN.

Any of the first network node 111 and the second network node 112 may be of different classes, such as, e.g., macro base station, home base station or pico base station, based on transmission power and thereby also cell size. Any of the first network node 111 and the second network node 112 may support one or several communication technologies, and its name may depend on the technology and terminology used.

In 5G/NR, any of the first network node 111 and the second network node 112 may be referred to as a gNB and may be directly connected to one or more core networks, which are not depicted in FIG. 1.

A plurality of wireless devices are located in the wireless communication network 100, whereof a wireless device 130, is depicted in the non-limiting example of FIG. 1. The wireless device 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the user equipments comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may comprised within the wireless communications network 100.

The wireless device 130 may be configured to communicate within the wireless communications network 100 with the first network node 111 in the first cell over a first link 141, e.g., a radio link. The wireless device 130 may be configured to communicate within the wireless communications network 100 with the first network node 111 in each of the one or more second cells over a respective second link, e.g., a radio link. The wireless device 130 may be configured to communicate within the wireless communications network 100 with the second network node 112 in the third cell over a third link 143, e.g., a radio link. The wireless device 130 may be configured to communicate within the wireless communications network 100 with the second network node 112 in each of the one or more fourth cells 124 over a respective fourth link, e.g., a radio link.

The first network node 111 and the second network node 112 may be configured to communicate within the wireless communications network 100 over a fifth link 150, e.g., a wired link or an X2 interface.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second" and/or "fourth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a network node, such as the second network node 112 or the first network node 111, e.g., a gNB, and embodiments related to a wireless device, such as the wireless device 130, e.g., a 5G UE.

It is an object of embodiments herein to improve the handling of power of transmission and reducing the time offset by a wireless device in a wireless communications network. It is a particular object of embodiments herein to improve the handling of power of transmission and reducing the time offset by a wireless device in dual connectivity.

The wireless device 130 embodiments relate to FIG. 2, FIG. 5, FIG. 6 and FIGS. 10-15.

A method, performed by a wireless device such as the wireless device 130, is described herein. The method may be understood to be for handling a power of transmission. The wireless device 130 may be configured with dual connectivity to be enabled to transmit using the first group of cells 121 and the second group of cells 123. The wireless device 130, the first group of cells 121 and the second group of cells 123 may be operating in the wireless communications network 100.

The method may comprise one or more of the following actions.

In some embodiments all the actions may be performed. One or more embodiments may be combined, where applicable. All possible combinations are not described to simplify the description. A non-limiting example of the method performed by the wireless device 130 is depicted in FIG. 2. Some actions may be performed in a different order than that shown in FIG. 2.

ii. Determining 203 a limit of a power of transmission of a first uplink transmission in the first group of cells 121 will now be described. The determining 203 may be based on a detection, before a time offset in relation to a beginning of a time of transmission of the first uplink transmission, of a downlink grant or assignment that triggers the second uplink transmission in the second group of cells that would overlap in time with the first uplink transmission. The uplink transmission may be one or more of a PUSCH or PUCCH or SRS transmission. The downlink grant or assignment may in some embodiments comprise a DCI message The wireless device 130 may be configured to perform action 203, e.g., by means of a determining unit 701 within the wireless device 130, configured to perform this action. The determining unit 701 may be the processor 706 of the wireless device 130, or an application running on such processor.

In some embodiments the power determination follows future 3GPP standard proposal according to the following description:

If a UE
is provided NR-DC-PC-mode=Dynamic, and
indicates a capability to determine a total transmission power on the SCG at a first symbol of a transmission occasion on the SCG by determining transmissions on the MCG that
are scheduled by DCI formats in PDCCH receptions with a last symbol that is earlier by more than $T_{offset}$ from the first symbol of the transmission occasion on the SCG, and
overlap with the transmission occasion on the SCG the UE determines a maximum transmission power on the SCG at the beginning of the transmission occasion on the SCG as
$\min(\hat{P}_{SCG}, P_{total}^{NR-DC} - \hat{P}_{MCG}^{actual})$, if the UE determines transmissions on the MCG with a $\hat{P}_{MCG}^{actual}$ total power
$\hat{P}_{Total}^{NR-DC}$, if the UE does not determine any transmissions on the MCG where
$T_{offset} = \max\{T_{proc,MCG}^{max}, T_{proc,SCG}^{max}\}$,
$T_{proc,MCG}^{max}$ and $T_{proc,SCG}^{max}$ is the maximum of $T_{proc,2}$, $T_{proc,CSI}$, $T_{proc,release}^{mux}$, $T_{proc,2}^{mux}$, and $T_{proc,CSI}^{mux}$ based on the configurations on the MCG and the SCG, respectively, when the UE indicates a first value for the capability, and
$T_{proc,MCG}^{max}$ and $T_{proc,SCG}^{max}$ is the maximum of $T_{proc,2}$, $T_{proc,CSI}$, $T_{proc,release}^{mux}$, $T_{proc,2}^{mux}$ based on the configurations on the MCG and the SCG, respectively, when the UE indicates a second value for the capability
The UE does not expect to have transmissions on the MCG that
are scheduled by DCI formats in PDCCH receptions with a last symbol that is earlier by less than or equal to $T_{offset}$ from the first symbol of the transmission occasion on the SCG, and
overlap with the transmission occasion on the SCG In some examples, if a wireless device configured with dual connectivity, e.g. NR-DC, and dynamic power sharing, is scheduled to transmit an uplink transmission on the SCG starting at time T, the UE does not expect to receive any MCG scheduling messages after a time T-T_offset that result in an MCG uplink transmission starting at time T and overlapping with an SCG uplink transmission that starts at time T.

The wireless device would indicate capability and the time offset would be calculated according to
For first capability $T_{offset} = \max\{T_{proc,MCG}^{max}, T_{proc,SCG}^{max}\}$, $T_{proc,MCG}^{max}$ and $T_{proc,SCG}^{max}$ is the maximum of $T_{proc,2}$, $T_{proc,CSI}$, $T_{proc,release}^{mux}$, $T_{proc,2}^{mux}$ and $T_{proc,CSI}^{mux}$ based on the configurations on the MCG and the SCG, respectively, when the UE indicates a first value for the capability, and For second capability $T_{offset} = \max\{T_{proc,MCG}^{max}, T_{proc,SCG}^{max}\}$, $T_{proc,MCG}^{max}$ and $T_{proc,SCG}^{max}$ is the maximum of $T_{proc,2}$, $T_{proc,CSI}$, $T_{proc,release}^{mux}$, $T_{proc,2}^{mux}$ based on the configurations on the MCG and the SCG, respectively, when the UE indicates a second value for the capability
Thus, T_offset would be dependent of CSI processing time both for the first capability and also for the second capability.

In some embodiments, T_offset based on a first capability and T_offset based on a second capability does not differ substantially. The calculation shows that Tproc,CSI and Tmux,CSI have similar in values and T_offset would have almost the same value for first capability and for the second capability for a given configuration of MCG and SCG. The calculation assumes 15 kHz and 30 kHz numerologies, respectively and no bandwidth part, BWP, switching enabled, PDSCH/PUSCH processing capability 1.

Detailed examples of the calculations of each term are shown below $T_{proc,2}$ $$T_{proc,2} = \max((N_2 + d_{2,1})(2048 + 144) \cdot \kappa 2^{-\mu} \cdot T_C, d_{2,2})$$

For 15 kHz, $1^{st}$ term is 0.85 ms
For 30 kHz, $1^{st}$ term is 0.46 ms
($2^{nd}$ term denotes BWP switch delay, which is not applicable for the example).

$T_{proc,CSI}$ $$T_{proc,CSI} = (Z)(2048 + 144) \cdot \kappa 2^{-\mu} \cdot T_C$$

For 15 kHz, 10 to 40 symbols (0.7 to 2.85 ms)
For 30 kHz, 13 to 72 symbols (0.46 to 2.57 ms)

$T_{mux,proc}$, release
$S_0$ is not before a symbol with CP starting after $T_{proc,release}^{mux}$ after a last symbol of any corresponding SPS PDSCH release. $T_{proc,release}^{mux}$ is given by maximum of $\{T_{proc,release}^{mux,1}, \dots, T_{proc,release}^{max,i} \dots\}$ where for the i-th PDCCH providing the SPS PDSCH release with corresponding HARQ-ACK transmission on a PUCCH which is in the group of overlapping PUCCHs and PUSCHs, $T_{proc,release}^{max,i} = (N+1) \cdot (2048 + 144) \cdot \kappa \cdot 2^{-\mu} \cdot T_C$, N is described in Clause 10.2 and is selected based on the UE PDSCH processing capability of the i-th SPS PDSCH release and SCS configuration y, where y corresponds to the smallest SCS configuration among the SCS configurations used for the PDCCH providing the i-th SPS PDSCH release, the PUCCH with corresponding HARQ-ACK transmission for i-th SPS PDSCH release, and all PUSCHs in the group of overlapping PUCCHs and PUSCHs. N=10 for $\mu=0$, N=12 for $\mu=1$, For 15 kHz, it is ~0.78 ms
For 30 kH, it is ~0.46 ms $T_{mux,proc2}$
If there is at least one PUSCH in the group of overlapping PUCCHs and PUSCHs, $T_{proc,2}^{mux}$ is given by maximum of $\{T_{proc,2}^{mux,1}, \dots, T_{proc,2}^{max,1} \dots\}$, where for the i-th PUSCH which is in the group of overlapping PUCCHs and PUSCHs, $T_{proc,2}^{mux} = \max((N_2 + d_{2,1} + 1) \cdot (2048 + 144) \cdot \kappa \cdot 2^{-\mu} \cdot T_C, d_{2,2})$, $d_{2,1}$ and $d_{2,2}$ are selected for the i-th PUSCH following [6, TS 38.214], $N_2$ is selected based on the UE PUSCH processing capability of the i-th PUSCH and SCS configuration $\mu$, where $\mu$ corresponds to the smallest SCS configuration among the SCS configurations used for the PDCCH scheduling the i-th PUSCH (if any), the PDCCHs scheduling the PDSCHs with corresponding HARQ-ACK transmission on a PUCCH which is in the group of overlapping PUCCHs/PUSCHs, and all PUSCHs in the group of overlapping PUCCHs and PUSCHs.

If there is no PUSCH in the group of overlapping PUCCHs and PUSCHs, $T_{proc,2}^{mux}$ given by maximum of $\{T_{proc,2}^{mux,1}, \dots, T_{proc,2}^{max,i} \dots\}$ where for the i-th PDSCH with corresponding HARQ-ACK transmission on a PUCCH which is in the group of overlapping PUCCHs, $T_{proc,2}^{mux,i} = (N_2 + 1) \cdot (2048 + 144) \cdot \kappa \cdot 2^{-\mu} \cdot T_C$, $N_2$ is selected based on the UE PUSCH processing capability of the PUCCH serving cell if configured. $N_2$ is selected based on the UE PUSCH processing capability 1, if PUSCH processing capability is not configured for the PUCCH serving cell. $\mu$ is selected based on the smallest SCS configuration between the SCS configuration used for the PDCCH scheduling the i-th PDSCH (if any) with corresponding HARQ-ACK transmission on a PUCCH which is in the group of overlapping PUCCHs, and the SCS configuration for the PUCCH serving cell.

For 15 kHz, it is 0.85 ms
For 30 kHz, it is 0.5 ms $T_{mux,proc,CSI}$
if there is an aperiodic CSI report multiplexed in a PUSCH in the group of overlapping PUCCHs and PUSCHs, So is not before a symbol with CP starting after $T_{proc,CSI}^{mux} = \max((Z+d) \cdot (2048 + 144) \cdot \kappa \cdot 2^{-\mu} \cdot T_C, d_{2,2})$ after a last symbol of
any PDCCH with the DCI format scheduling an overlapping PUSCH, and
any PDCCH scheduling a PDSCH or SPS PDSCH release with corresponding HARQ-ACK information in an overlapping PUCCH in the slot
where $\mu$ corresponds to the smallest SCS configuration among the SCS configuration of the PDCCHs, the smallest SCS configuration for the group of the overlapping PUSCHs, and the smallest SCS configuration of CSI-RS associated with the DCI format scheduling the PUSCH with the multiplexed aperiodic CSI report, and d=2 for $\mu=0,1$, d=3 for $\mu=2$ and d=4 for $\mu=3$ For 15 kHz, it is 12 to 42 symbols (0.85 to 3 ms)
For 30 kHz, it is 15 to 74 symbols (0.5 to 2.57 ms)
Table 1 summarises all the calculation shown above.

TABLE 1

| | First value for the capability | | Second value for the capability | |
|---|---|---|---|---|
| | 15 kHz | 30 KHz | 15 kHz | 30 KHz |
| Tproc, 2 | 0.85 ms | 0.46 ms | 0.85 ms | 0.46 ms |
| Tproc, CSI | 0.7 to 2.85 ms | 0.46 to 2.57 ms | 0.7 to 2.85 ms | 0.46 to 2.57 ms |
| Tmux, proc, release | 0.78 ms | 0.46 ms | 0.78 ms | 0.46 ms |
| Tmux, proc2 | 0.85 ms | 0.5 ms | 0.85 ms | 0.5 ms |
| Tmux, proc, CSI | 0.85 to 3 ms | 0.5 to 2.64 ms | N/A | N/A |
| Toffset | 3 ms | 2.64 ms | 2.85 ms | 2.57 ms |

If T_offset would be calculated using some of the embodiments disclosed herein the, where the CSI processing time is excluded from the calculation ($T_{proc,CSI}$ is not included in the determination of T_offset), T_offset would have a value of 0.85 ms for 15 kHz, and 0.5 ms for 30 kHz when the wireless device indicated a second capability. Thus T_offset would be shorter is the CSI processing time is excluded from the determination of T_offset.

In other embodiments, $T_{proc,CSI}$ is not excluded from the determination of T_offset when the wireless device indicates a second capability but $T_{proc,CSI}$ is used with restrictions. For example, for 15 kHz $T_{proc,CSI}$ in the range 0.7 to 2.85 ms corresponds to different reporting criteria such as PUSCH vs PUCCH, and number of updates, etc, corresponding to the variables Z1, Z'1 and Z2. In the embodiments, only $T_{proc,CSI}$ corresponding to Z1 and Z1' may be considered, Z2 is not considered. In such an example, the T_offset value for 15 KHz for a second value of capability may be, for 22 symbols at 15 KHz, ~1.57 ms.

In some embodiments, $T_{proc,CSI}$ is considered in computation of $T^{max}_{(proc,MCG)}$ and $T^{max}_{(proc,SCG)}$ for both first and second capability. However, a first set of parameters or value range of parameters are considered when determining $T_{proc,CSI}$ when first capability is reported by the UE and second set of parameters or value range of parameters are used for determining $T_{proc,CSI}$ when second capability is reported by the UE. For example, the first set of parameters can include $Z1$, $Z'1$ and $Z2$. The second set of parameters may include $Z1$ and $Z'1$ but not $Z2$ $$Z = \max_{m=0,\dots,M-1}(Z(m)) \text{ and } Z' = \max_{m=0,\dots,M-1}(Z'(m)),$$

where M is the number of updated CSI report(s) according to Clause 5.2.1.6, $(Z(m), Z'(m))$ corresponds to the m-th updated CSI report and is defined as

- $(Z_1,Z_1)$ of the table 5.4-1 if the CSI is triggered without a PUSCH with either transport block or HARQ-ACK or both when L=0 CPUs are occupied (according to Clause 5.2.1.6) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or
- $(Z_1,Z_1')$ of the table 5.4-2 if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or
- $(Z_1,Z_1')$ of the table 5.4-2 if the CSI to be transmitted corresponds to wideband frequency-granularity where the reportQuantity is set to 'ssb-Index-SINR', or reportQuantity is set to 'cri-SINR', or
- $(Z_3,Z_3')$ of the table 5.4-2 if reportQuantity is set to 'cri-RSRP' or 'ssb-Index-RSRP', where $X\mu$ is according to UE reported capability beamReportTiming and $KB$, is according to UE reported capability beamSwitchTiming as defined in [13, TS 38.306], or
- $(Z_2,Z_2')$ of table 5.4-2 otherwise.

$\mu$ of table 5.4-1 and table 5.4-2 corresponds to the min $(\mu_{PDCCH},\mu_{CSI-RS},\mu_{UL})$ where the $\mu_{PDCCH}$ corresponds to the subcarrier spacing of the PDCCH with which the DCI was transmitted and $\mu_{UL}$ corresponds to the subcarrier spacing of the PUSCH with which the CSI report is to be transmitted and $\mu_{CSI-RS}$ corresponds to the minimum subcarrier spacing of the aperiodic CSI-RS triggered by the DCI

TABLE 5.4-1

| CSI computation delay requirement 1 | | |
|---|---|---|
| | $Z_1$ [symbols] | |
| $\mu$ | $Z_1$ | $Z'_1$ |
| 0 | 10 | 8 |
| 1 | 13 | 11 |
| 2 | 25 | 21 |
| 3 | 43 | 36 |

TABLE 5.4-2

| CSI computation delay requirement 2 | | | | | |
|---|---|---|---|---|---|
| | $Z_1$ [symbols] | | $Z_2$ [symbols] | | $Z_3$ [symbols] |
| $\mu$ | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | $min(44, X_2 + KB_1)$ | $X_2$ |
| 3 | 97 | 85 | 152 | 140 | $min(97, X_3 + KB_2)$ | $X_3$ |

In some embodiments, T_offset is independent of CSI processing time for at least some capabilities indicated by the wireless device.

The wireless device would indicate capability and the time offset would be calculated according to:

$$T_{offset}=\max\{T_{proc,MCG}^{max},T_{proc,SCG}^{max}\},$$

$T_{proc,MCG}^{max}$ and $T_{proc,SCG}^{max}$ is the maximum of $T_{proc,2}$ $T_{proc,release}^{mux}$, $T_{proc,2}^{mux}$ based on the configurations on the MCG and the SCG, respectively.

Thus, T_offset would be independent of CSI processing time, e.g. if the wireless device indicates a second capability. T_offset could still be dependent of the CSI processing time for the first capability.

A future 3GPP standard could then be described according to:

If a UE
- is provided NR-DC-PC-mode=Dynamic, and
- indicates a capability to determine a total transmission power on the SCG at a first symbol of a transmission occasion on the SCG by determining transmissions on the MCG that
  - are scheduled by DCI formats in PDCCH receptions with a last symbol that is earlier by more than $T_{offset}$ from the first symbol of the transmission occasion on the SCG, and
  - overlap with the transmission occasion on the SCG the UE determines a maximum transmission power on the SCG at the beginning of the transmission occasion on the SCG as $\min(\hat{P}_{SCG},\hat{P}_{total}^{NR-DC}-\hat{P}_{MCG}^{actual})$, if the UE determines transmissions on the MCG with a $\hat{P}_{MCG}^{actual}$ total power $\hat{P}_{Total}^{NR-DC}$ if the UE does not determine any transmissions on the MCG where $$T_{offset}=\max\{T_{proc,MCG}^{max},T_{proc,SCG}^{max}\},$$

$T_{proc,MCG}^{max}$ and $T_{proc,SCG}^{max}$ is the maximum of $T_{proc,2}$, $T_{proc,CSI}$, $T_{proc,release}^{mux}$, $T_{proc,2}^{mux}$ and $T_{proc,CSI}^{mux}$ based on the configurations on the MCG and the SCG, respectively, when the UE indicates a first value for the capability, and $T_{proc,MCG}^{max}$ and $T_{proc,SCG}^{max}$ is the maximum of $T_{proc,2}$, $T_{proc,release}^{mux}$, $T_{proc,2}^{mux}$ based on the configurations on the MCG and the SCG, respectively, when the UE indicates a second value for the capability The UE does not expect to have transmissions on the MCG that
- are scheduled by DCI formats in PDCCH receptions with a last symbol that is earlier by less than or equal to $T_{offset}$ from the first symbol of the transmission occasion on the SCG, and
- overlap with the transmission occasion on the SCG Thus, if the wireless device would indicate a second capability the T_offset would be determined without dependency of the CSI processing time. This could reduce the time offset and improve latency.

In some examples, the wireless device 130 may determine the power limit based on a detection of a downlink grant or assignment that triggers the second uplink transmission in the second group of cells that would overlap in time with the first uplink transmission, where the detection is before a time offset in relation to a beginning of a time of transmission of the first uplink transmission. The time offset may e.g. be based on a capability of the wireless device. The time offset may also be dependent on at least a certain subset of processing times related to channel information state, CSI, processing if the wireless device indicates a first value for capability and independent of the CSI processing time if the wireless device indicates a second value for the capability, e.g., as part of the determining 203, the power of transmission of the first uplink transmission.

In some embodiments, the time offset may e.g. be based on a capability of the wireless device. The time offset may also be dependent on at least a certain subset of processing times related to channel information state, CSI, processing if the wireless device indicates a first value for capability and independent of the CSI processing time if the wireless device indicates a second value for the capability.

In some examples, when the wireless device indicates a first value for the capability the time offset is obtained from processing times which comprises at least a certain subset of processing times related to channel information state, CSI, processing; and when the wireless device indicates a second value for the capability the time offset is obtained from processing times which do not comprises processing times related to CSI processing.

In some examples, the time offset obtained from processing times which comprises at least a certain subset of processing times related to CSI processing is shorter than a time offset obtained from processing times which do not comprises processing times related to CSI processing.

In some embodiments, the wireless device is configured with at least two cell groups, CG1 and CG2. The first cell group, CG1, and a second cell group, CG2, each includes one or more serving cells. The wireless device is scheduled to make a first uplink transmission, such as PUSCH or PUCCH or SRS or PRACH for a serving cell in CG1. The wireless device can use a power limit to determine the transmission power for the first uplink transmission. The power limit is determined using a time offset (T_offset) from the beginning of the first uplink transmission, a first set of parameters corresponding to CG2, and whether there are any DL grants/assignments detected before (or received before, or known before) T_offset that trigger an uplink transmission in CG2 that overlaps with the first uplink transmission.

In some embodiments, it is preferable to avoid that MCG scheduling grant schedules MCG transmission before the time, T-T_offset, where T is the time at which an SCG transmission begins. There may also be MCG commands that changes the power setting of the MCG transmission after T-T_offset.

In some embodiments, a wireless device, configured with dual connectivity, is scheduled or configured to make a first uplink transmission starting at time TO. The first uplink transmission can be for a first serving cell belonging to a first cell group used for DC, e.g. SCG. The UE is also scheduled or configured to make a second uplink transmission that overlaps in time with the first uplink transmission. The second uplink transmission can be for a second serving cell belonging to a second cell group used for DC, e.g. MCG. To determine the transmit power of the second uplink transmission, the UE uses only those transmit power control (TPC) commands that are received before the time TO-T_offset-A where:

T_offset can be defined from the embodiments disclosed herein.

A can be a first value (e.g. ˜35 us) if synchronous DC is used and a second value larger than the first value (e.g. ˜500 us) if asynchronous DC is used. In some embodiments, delta can be zero (i.e., not used by the wireless device or considered to be included in T_offset implicitly). In some cases, A can be determined from inter-gNB signaling example using the methods described in other embodiments.

The TPC commands can be included in a first DCI format that contains jointly coded TPC commands. The first DCI format may not schedule/assign PUSCH/PDSCH transmissions. The DCI CRC for the first DCI format can be scrambled by TPC-PUSCH-RNTI or a TPC-PUCCH-RNTI or TPC-SRS-RNTI configured by higher layers. The first DCI format can be DCI format 2_2 or 2_3. The TPC commands can be included in a second DCI format that schedules an uplink PUSCH transmission (or assigns a PDSCH triggering an uplink PUCCH transmission). In some cases, the second DCI format can be DCI format 0_0,0_1,1_0,1_1 which also schedule PDSCH/PUSCH transmissions along with TPC indication.

In some embodiments, if the wireless device receives any TPC commands after time TO-T_offset-A, it may discard them when computing the transmit power of the second uplink transmission.

In some cases, if the wireless device receives any TPC commands after time T0-T_offset-A, it may apply them only for uplink transmissions of the second cell group starting after T0.

In addition to above conditions, the wireless device may also use other conditions for determining which TPC commands to use. For example, if the second uplink transmission corresponds to transmission occasion i, it may use the TPC commands received between K(i−i0)−1 symbols before uplink transmission occasion and K(i)−1 symbols before uplink transmission occasion, where is the smallest integer for which K(i−i0) symbols before uplink transmission occasion is earlier than K(i) symbols before uplink transmission occasion. The symbols can be OFDM symbol durations in the numerology of the uplink transmission.

If the uplink transmission is a PUSCH transmission configured by ConfiguredGrantConfig, the function K( ) can be based on minimum possible scheduling delay configured for the UE by higher layers (e.g. using RRC parameter PUSCH-ConfigCommon)

If the uplink transmission is a PUSCH/PUCCH transmission triggered by PDCCH DCI, the funvtion K( ) can be based on number of symbols between the last symbol of the corresponding PDCCH reception and the first symbol of the uplink transmission.

In some cases, the NW (e.g. MgNB) may adapt its scheduling such that a TPC command corresponding to second uplink transmission or second uplink transmission occasion is not sent to the UE prior to T0-T_offset-A.

In some embodiments, the the power of the second uplink transmission is determined by transmit power control, TPC, commands received before the time offset.

In some examples, the TPC commands received after the time offset and A in relation to a beginning of a time of transmission of the first uplink transmission are discarded when computing the transmit power of the second uplink transmission, where the delta value is depending on whether dual connectivity is synchronous or asynchronous.

In some embodiments, the TPC commands received after the time offset and delta in relation to a beginning of a time of transmission of the first uplink transmission are applied to second uplink transmission received after beginning of a time of transmission of the first uplink transmission, where the delta value is depending on whether dual connectivity is synchronous or asynchronous.

Setting 204 the power of transmission to transmit the first uplink transmission, based on the determined limit will now be described. The wireless device 130 may be configured to perform this setting action 204, e.g., by means of a setting unit 702 within the wireless device 130, configured to perform this action. The setting unit 702 may be the processor 706 of the wireless device 130, or an application running on such processor.

In some embodiments, the method may further comprise the following action:

Obtaining 202, e.g., from a network node 111, 112 serving the wireless device 130 the one or more parameters will now be described. The wireless device 130 may be configured to perform this obtaining action 202, e.g., by means of an obtaining unit 703 within the wireless device 130, configured to perform this action. The obtaining unit 703 may be a processor 706 of the wireless device 130, or an application running on such processor.

The obtaining in this Action 202 may be performed via the first link 141, or the second link 142.

In some embodiments, the determining 201 may be further based on a prediction, based on one or more parameters, of a downlink transmission set to trigger the second uplink transmission.

Other units 705 may be comprised in the wireless device 130.

Detecting 201 a first downlink transmission set to trigger the second uplink transmission, in a time period preceding a beginning of the transmission of the first uplink transmission, and wherein the determining 203 is further based on the detecting 201 of the first downlink transmission will now be described. The wireless device 130 may be configured to perform this detecting action 201, e.g., by means of a detecting unit 704 within the wireless device 130, configured to perform this action. The detecting unit 704 may be a processor 706 of the wireless device 130, or an application running on such processor.

The determining 203 may comprise ensuring that a combined power of transmission across the first group of cells 121 and the second group of cells 123 does not exceed a threshold, e.g., a limit of the power or power limit.

The wireless device 130 may also be configured to communicate user data with a host application unit in a host computer 1110, e.g., via another link such as 1150.

In FIG. 7, optional units are indicated with dashed boxes.

The wireless device 130 may comprise an interface unit to facilitate communications between the wireless device 130 and other nodes or devices, e.g., the network node 111, 112, the host computer 1110, or any of the other nodes. In some particular examples, the interface may, for example, include a transceiver configured to transmit and receive radio signals over an air interface in accordance with a suitable standard.

Figure 11:
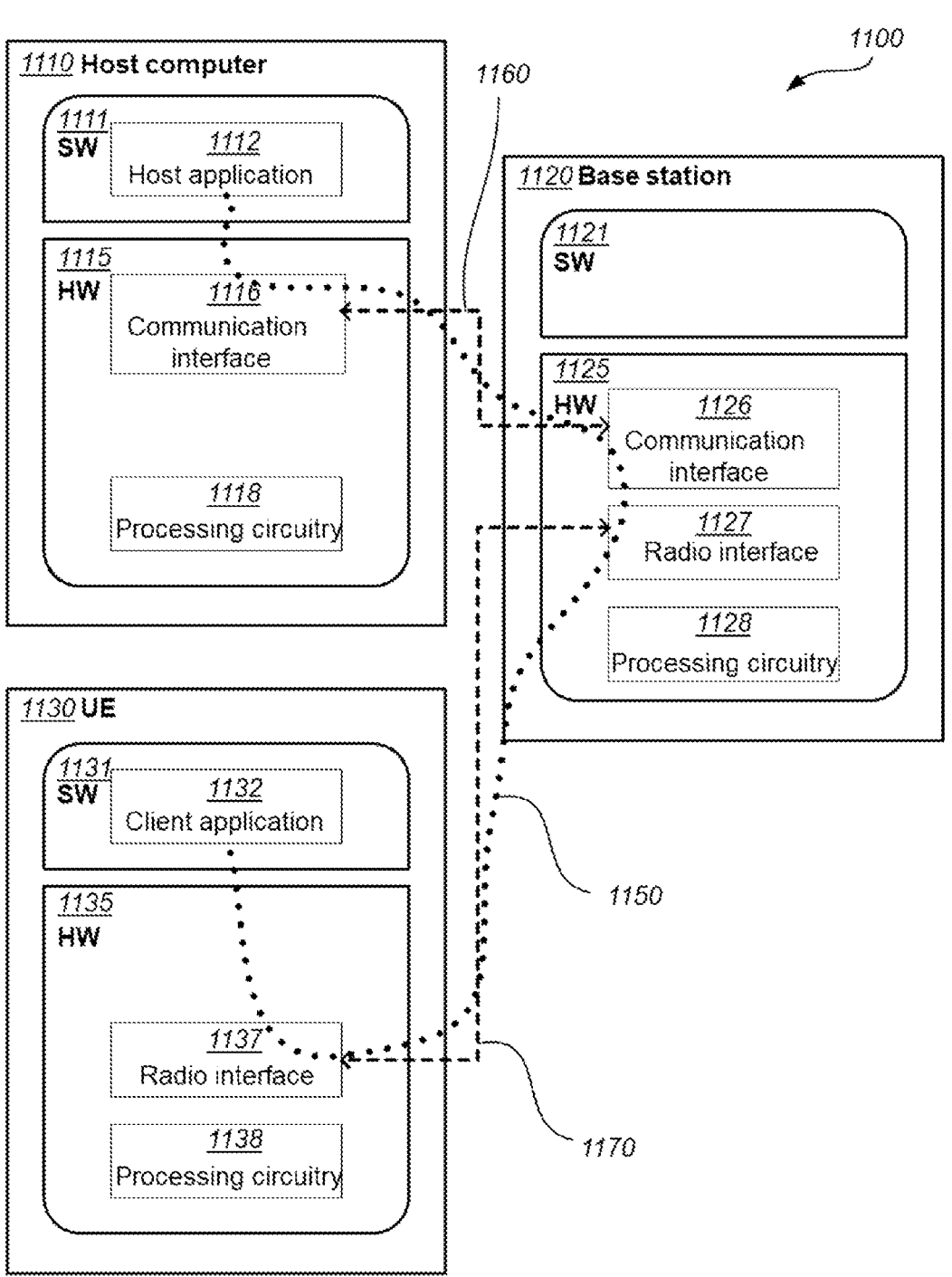
FIG. 11 is a generalized block diagram of a host computer communicating via a base station with a user equipment over a partially wireless connection, according to embodiments herein.

The wireless device 130 may comprise an arrangement as shown in FIG. 7 or in FIG. 11.

By the wireless device 130 determining 203 the limit of the power of transmission of the first uplink transmission in the first group of cells 121 and setting the power of transmission based on the determined limit, the wireless device 130 is enabled to transmit at higher power, e.g., full power, if it determines that there are no scheduling grants/assignments or potential scheduling grants/assignments triggering an overlapping transmission. This may be understood to improve system performance. Moreover, a simpler implementation in the wireless device 130 is enabled, where hardware/software in the wireless device 130 may set transmission power of a the first group of cells 121 without an exact computation of transmission power of overlapping transmissions on the second group of cells 123.

The first network node 111 embodiments relate to FIG. 3, and FIGS. 10-15.

A method, performed by a first network node, such as the first network node 111 is described herein. The method may be understood to be handling a power of transmission of the wireless device 130. The wireless device 130 may be served by the first network node 111 using the first group of cells 121. The first network node 111, and the wireless device 130 may be operating in the wireless communications network 100.

The first network node 111 may serve the wireless device 130 using the first group of cells 121 in a dual connectivity configuration comprising the second group of cells 123.

The method may comprise one or more of the following actions.

In some embodiments, all the actions may be performed. One or more embodiments may be combined, where applicable. All possible combinations are not described to simplify the description. A non-limiting example of the method performed by the first network node 111 is depicted in FIG. 3. Some actions may be performed in a different order than that shown in FIG. 3.

Configuring 301 one or more scheduling parameters for one or more transmissions by a wireless device 130 will now be described. The configuring may be such that a delay between a downlink message and a corresponding uplink transmission is greater than a value. The first network node 111 may be configured to perform this configuring action 301, e.g. by means of a configuring unit 801 within the first network node 111, configured to perform this action. The configuring unit 801 may be a processor 804 of the first network node 111, or an application running on such processor.

Sending 302 a first message to the second base network node 112, the first message comprising an indication of the configured one or more scheduling parameters will now be described. The first network node 111 may be configured to perform this sending action 302, e.g. by means of a sending unit 802, configured to perform this action. The sending unit 802 may be a processor 804 of the first network node 111, or an application running on such processor.

Sending may be performed, e.g., via the first link 141.

In some embodiments, the indication of the configured one or more scheduling parameters includes the time offset value In some embodiments, the time offset value is based on a capability signaling of the wireless device.

In some embodiments, the time offset is dependent on at least a certain subset of processing times related to channel information state, CSI, processing if the wireless device indicates a first value for capability and independent of the CSI processing time if the wireless device indicates a second value for the capability.

In some embodiments, when the wireless device indicates a first value for the capability the time offset is obtained from processing times which comprises at least a certain subset of processing times related to channel information state, CSI, processing; and when the wireless device indicates a second value for the capability the time offset is obtained from processing times which do not comprises processing times related to CSI processing.

In some embodiments, the method may further comprise one or more of the following actions:

Scheduling 304 a first transmission of the one or more transmissions based on the configured one or more scheduling parameters will now be described. The first network node 111 may be configured to perform this scheduling action 304, e.g., by means of a scheduling unit 803 within the first network node 111, configured to perform this action. The scheduling unit 803 may be the processor 804 of the first network node 111, or an application running on such processor.

In some embodiments wherein the first network node 111 may serve the wireless device 130 using the first group of cells 121 in the dual connectivity configuration comprising the second group of cells 123, the method may further comprise:

Sending 303 one or more parameters, e.g., a first indication of the one or more parameters, to the wireless device 130, the one or more parameters being of the second group of cells 123 will now be described. The first network node 111 may be configured to perform this sending action 303, e.g., by means of the sending unit 802 within the first network node 111, configured to perform this action.

Sending may be performed, e.g., via the first link 141.

Other units 811 may be comprised in the first network node 111.

The first network node 111 may also be configured to communicate user data with a host application unit in a host computer 1110, e.g., via another link such as 1150.

In FIG. 8, optional units are indicated with dashed boxes.

The first network node 111 may comprise an interface unit to facilitate communications between the first network node 111 and other nodes or devices, e.g., the another first network node 111, the wireless device 130, the host computer 1110, or any of the other nodes. In some particular examples, the interface may, for example, include a transceiver configured to transmit and receive radio signals over an air interface in accordance with a suitable standard.

The first network node 111 may comprise an arrangement as shown in FIG. 8 or in FIG. 11.

Some embodiments herein will now be further described with some non-limiting examples.

In the following description, any reference to a/the UE, or simply "UE" may be understood to equally refer the wireless device 130; any reference to a/the gNBs may be understood to equally refer to the first network node 111, and/or the second network node 112; any reference to a/the first cell group or a/the a first cell group CG1 may be understood to equally refer the first group of cells 121; any reference to a/the second cell group or a/the a first cell group CG2 may be understood to equally refer the second group of cells 123.

The second network node 112 embodiments relate to FIG. 4, and FIGS. 10-15.

A method, performed by a second network node, such as the second network node 112 is described herein. The method may be understood to be handling a power of transmission of the wireless device 130. The wireless device 130 may be served by the second network node 112 using the second group of cells 123. The second network node 112, and the wireless device 130 may be operating in the wireless communications network 100.

The second network node 112 may serve the wireless device 130 using the second group of cells 123 in the dual connectivity configuration comprising the first group of cells 121.

The method may comprise one or more of the following actions.

In some embodiments, all the actions may be performed. One or more embodiments may be combined, where applicable. All possible combinations are not described to simplify the description. A non-limiting example of the method performed by the second network node 112 is depicted in FIG. 4. Some actions may be performed in a different order than that shown in FIG. 4.

Receiving 401 the first message from the first network node 111 will now be described. The first message may comprise the indication of the one or more scheduling parameters configured by the first network node 111. The configured one or more scheduling parameters may be for one or more transmissions by the wireless device 130. The configured one or more parameters may be such that the delay between the downlink message and the corresponding uplink transmission is greater than the value. The second network node 112 may be configured to perform this receiving action 401, e.g. by means of a receiving unit 901 within the second network node 112, configured to perform this action. The receiving unit 901 may be a processor 903 of the second network node 112, or an application running on such processor.

In some embodiments wherein the second network node 112 may serve the wireless device 130 using the second group of cells 123 in the dual connectivity configuration comprising the first group of cells 121, the method may further comprise:

Sending 402 one or more parameters, e.g., a second indication of the one or more parameters, to the wireless device 130. The one or more parameters may be of the second group of cells 123. The second network node 112 may be configured to perform this sending action 402, e.g. by means of a sending unit 902, configured to perform this action. The sending unit 902 may be a processor 903 of the second network node 112, or an application running on such processor.

Sending may be performed, e.g., via the second link 142.

In some embodiments, the indication of the configured one or more scheduling parameters includes the time offset value In some embodiments, the time offset value is based on a capability signaling of the wireless device.

In some embodiments, the time offset is dependent on at least a certain subset of processing times related to channel information state, CSI, processing if the wireless device indicates a first value for capability and independent of the CSI processing time if the wireless device indicates a second value for the capability.

In some embodiments, when the wireless device indicates a first value for the capability the time offset is obtained from processing times which comprises at least a certain subset of processing times related to channel information state, CSI, processing; and when the wireless device indicates a second value for the capability the time offset is obtained from processing times which do not comprises processing times related to CSI processing.

In some embodiments, the method may further comprise one or more of the following actions:

Scheduling 403 a second transmission of the one or more transmissions based on the configured one or more scheduling parameters. The second network node 112 may be configured to perform this scheduling action 403, e.g., by means of a scheduling unit 910 within the second network node 112, configured to perform this action. The scheduling unit 910 may be the processor 903 of the second network node 112, or an application running on such processor.

Other units 911 may be comprised in the second network node 112.

The second network node 112 may also be configured to communicate user data with a host application unit in a host computer 1110, e.g., via another link such as 1150.

In FIG. 9, optional units are indicated with dashed boxes.

The second network node 112 may comprise an interface unit to facilitate communications between the second network node 112 and other nodes or devices, e.g., the first network node 111, the wireless device 130, the host computer 1110, or any of the other nodes. In some particular examples, the interface may, for example, include a transceiver configured to transmit and receive radio signals over an air interface in accordance with a suitable standard.

The second network node 112 may comprise an arrangement as shown in FIG. 9 or in FIG. 11.

Some embodiments herein will now be further described with some non-limiting examples.

In the following description, any reference to a/the UE, or simply "UE" may be understood to equally refer the wireless device 130; any reference to a/the gNBs may be understood to equally refer to the first network node 111, and/or the second network node 112; any reference to a/the first cell group or a/the a first cell group CG1 may be understood to equally refer the first cell group 121; any reference to a/the second cell group or a/the a first cell group CG2 may be understood to equally refer the second cell group 123.

A first group of examples will now be described.

In a first group of examples, a UE may be configured with at least two cell groups. For example, a first cell group CG1 and a second cell group CG2. Each cell group may comprise one or more serving cells. The UE may be scheduled to make a first uplink transmission, e.g., PUSCH,PUCCH,SRS, PRACH, for a serving cell in CG1. The UE may use a power limit to determine the transmission power for the first uplink transmission. The power limit may be determined using a time offset (T_offset) from the beginning of the first uplink transmission, a first set of parameters corresponding to CG2, and whether there are any DL grants/assignments detected before (or received before) T_offset that may trigger an uplink transmission in CG2 that may overlap with the first uplink transmission.

Figure 5:
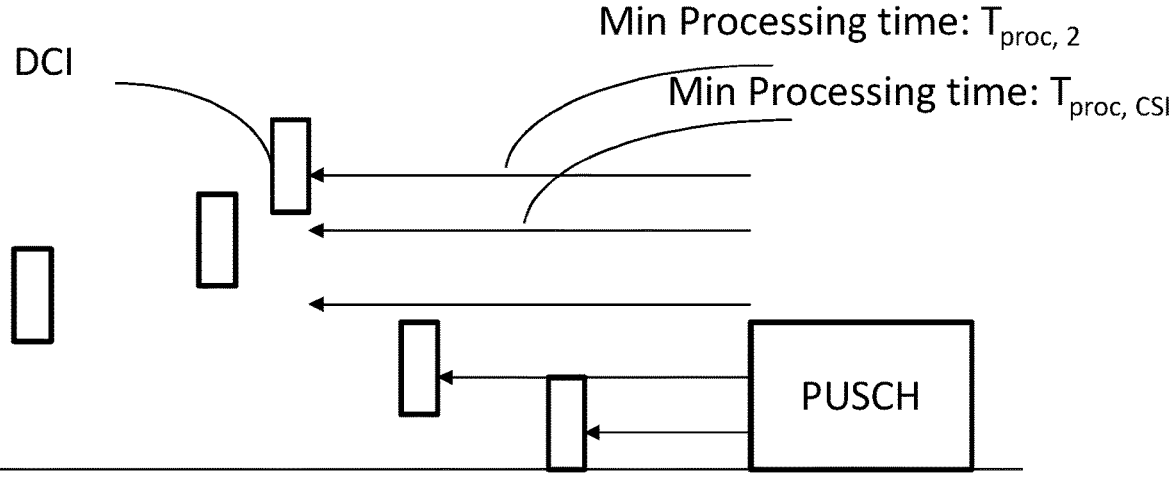
FIG. 5 is a schematic block diagram illustrating aspects of a method performed by wireless device, according to embodiments herein.

FIG. 5 shows an illustration of minimum UE processing time, DCI reception and PUSCH transmission for typical uplink transmissions. The NW should schedule the DL scheduling messages (in DCI) such that UE is guaranteed a minimum processing time (shown by horizontal line with arrows) for preparing and transmitting the corresponding uplink transmission. The minimum processing time can vary for different uplink transmissions based on UE capability, RRC configuration, exact scheduling message (e.g. if CSI is requested, if PUCCH/PUSCH overlap), etc. If minimum processing time is not satisfied, UE may not provide a valid uplink transmission in response to DL scheduling message or UE may discard or ignore the scheduling message or consider it invalid.

A second group of examples will now be described.

In a second group of examples, a UE may be configured with at least two cell groups. For example, a first cell group CG1 and a second cell group CG2. Each cell group may comprise one or more serving cells. The UE may be scheduled to make a first uplink transmission, e.g., PUSCH, PUCCH,SRS,PRACH, for a serving cell in CG1. The UE may use a power limit to determine the transmission power for the first uplink transmission. The power limit may be determined using a time offset (T_offset) from the beginning of the first uplink transmission, and a first set of parameters corresponding to CG2.

Figure 6:
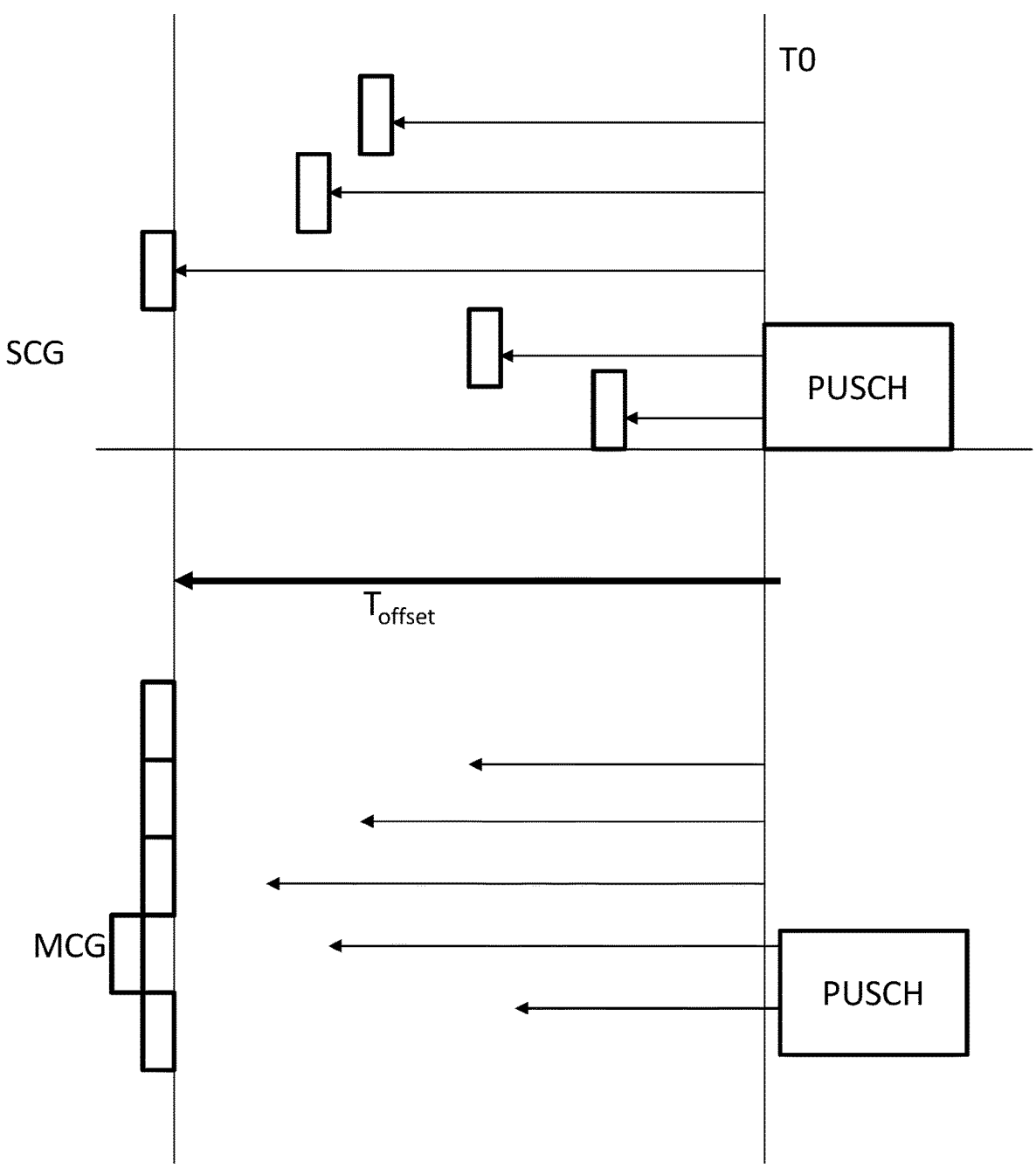
FIG. 6 is a schematic block diagram illustrating aspects of a method performed by wireless device, according to embodiments herein.

FIG. 6 shows an illustration of minimum UE processing time, $T_{offset}$, DCI reception and PUSCH transmission on SCG. The figure shows a $T_{offset}$ that is calculated as the largest processing time across MCG and SCG configurations for the UE. This $T_{offset}$ basically becomes a scheduling restriction at the MCG i.e. for an uplink transmission on SCG that is scheduled to begin at time T0, the MCG cannot schedule any overlapping uplink transmission on MCG unless the scheduling message of the MCG is received before time $T0-T_{offset}$ at the UE. Thus, the possible PUSCH transmission (shown in dotted box) of MCG can be scheduled only by DCIs received before $T0-T_{offset}$. In the figure, the minimum processing times are shown by horizontal lines with arrows.

Certain embodiments disclosed herein may provide one or more of the following technical advantage(s), which may be summarized as follows. Embodiments herein may be understood to allow the UE to transmit at higher power, e.g., full power, if it determines that there are no scheduling grants/ assignments or potential scheduling grants/assignments triggering an overlapping transmission. This may be understood to improve system performance. Embodiments herein may be understood to also allow a simpler UE implementation where UE hardware/software may set transmission power of a first CG without an exact computation of transmission power of overlapping transmissions on a second CG.

Figure 7A:
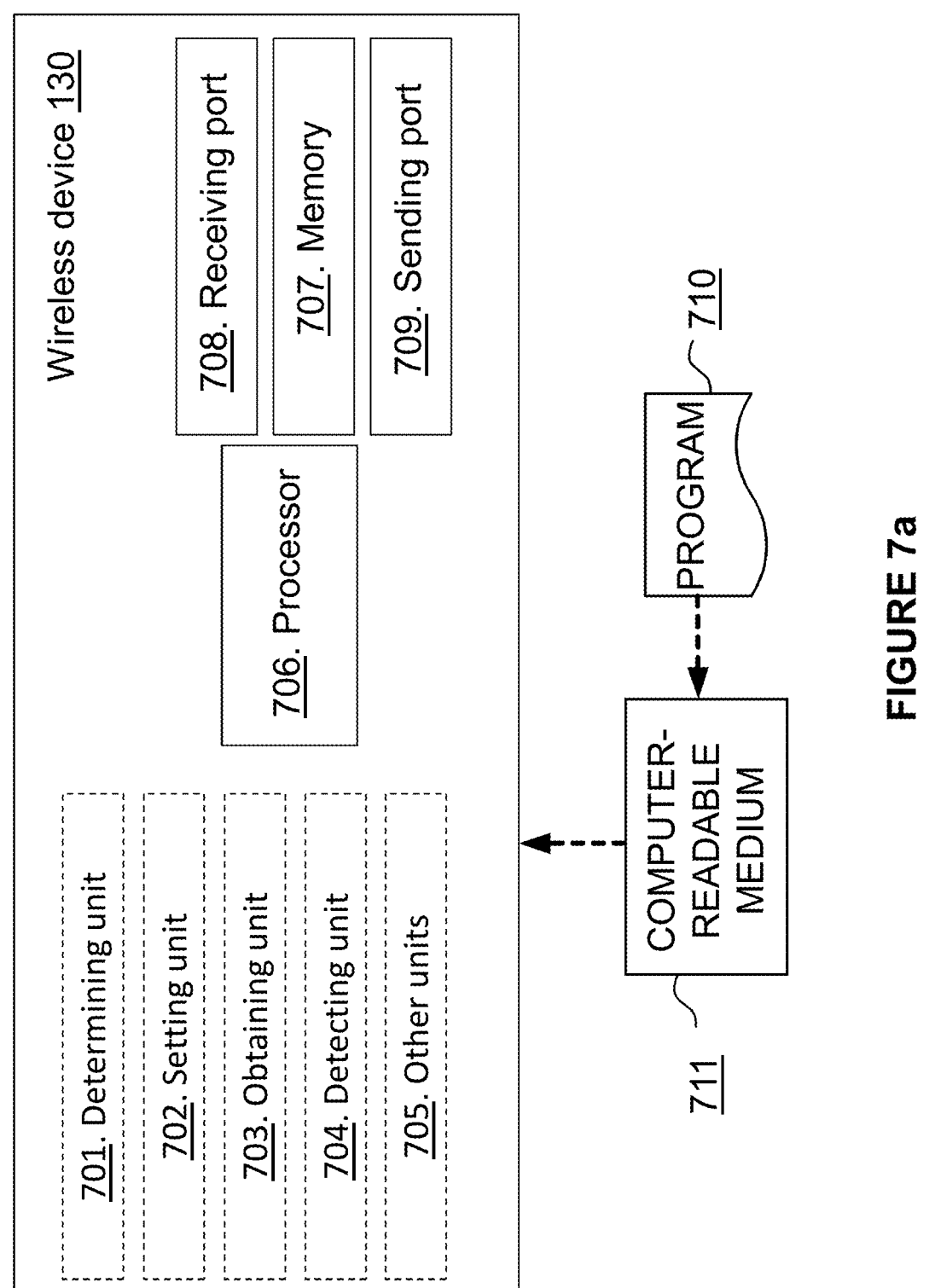
FIG. 7 is a schematic block diagram illustrating a wireless device, according to embodiments herein.

FIG. 7 depicts two different examples in panels a) and b), respectively, of the arrangement that the wireless device 130 may comprise to perform the method actions described above in relation to FIG. 2. In some embodiments, the wireless device 130 may comprise the following arrangement depicted in FIG. 7*a*.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the wireless device 130, and will thus not be repeated here.

In FIG. 7, optional modules are indicated with dashed boxes.

The embodiments herein in the wireless device 130 may be implemented through one or more processors, such as a processor 706 in the wireless device 130 depicted in FIG. 7*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 707 comprising one or more memory units. The memory 707 is arranged to be used to store obtained information, store data, configurations, schedulings, and applications etc. to perform the methods herein when being executed in the wireless device 130.

In some embodiments, the wireless device 130 may receive information from, e.g., the first network node 111 and/or the second network node 112, through a receiving port 708. In some embodiments, the receiving port 708 may be, for example, connected to one or more antennas in wireless device 130. In other embodiments, the wireless device 130 may receive information from another structure in the wireless communications network 100 through the receiving port 708. Since the receiving port 708 may be in communication with the processor 706, the receiving port 708 may then send the received information to the processor 706. The receiving port 708 may also be configured to receive other information.

The processor 706 in the wireless device 130 may be further configured to transmit or send information to e.g., the first network node 111 and/or the second network node 112 or another structure in the wireless communications network 100, through a sending port 709, which may be in communication with the processor 706, and the memory 707.

Those skilled in the art will also appreciate that the determining unit 701, the setting unit 702, the obtaining unit 703, the detecting unit 704 and the other units 705 described above may refer to a combination of analog and digital modules, and/or one or more processors configured with software and/or firmware, e.g., stored in memory, that, when executed by the one or more processors such as the processor 706, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 701-705 described above may be implemented as one or more applications running on one or more processors such as the processor 706.

Thus, the methods according to the embodiments described herein for the wireless device 130 may be respectively implemented by means of a computer program 710 product, comprising instructions, i.e., software code portions, which, when executed on at least one processor 706, cause the at least one processor 706 to carry out the actions described herein, as performed by the wireless device 130. The computer program 710 product may be stored on a computer-readable storage medium 711. The computer-readable storage medium 711, having stored thereon the computer program 710, may comprise instructions which, when executed on at least one processor 706, cause the at least one processor 706 to carry out the actions described herein, as performed by the wireless device 130. In some embodiments, the computer-readable storage medium 711 may be a non-transitory computer-readable storage medium, such as a CD ROM disc, or a memory stick. In other embodiments, the computer program 710 product may be stored on a carrier containing the computer program 710 just described, wherein the carrier is one of an electronic signal, optical signal, radio signal, or the computer-readable storage medium 711, as described above.

The wireless device 130 may comprise a communication interface configured to facilitate communications between the wireless device 130 and other nodes or devices, e.g., the first network node 111 or the second network node 112. The interface may, for example, include a transceiver configured to transmit and receive radio signals over an air interface in accordance with a suitable standard.

Figure 7B:
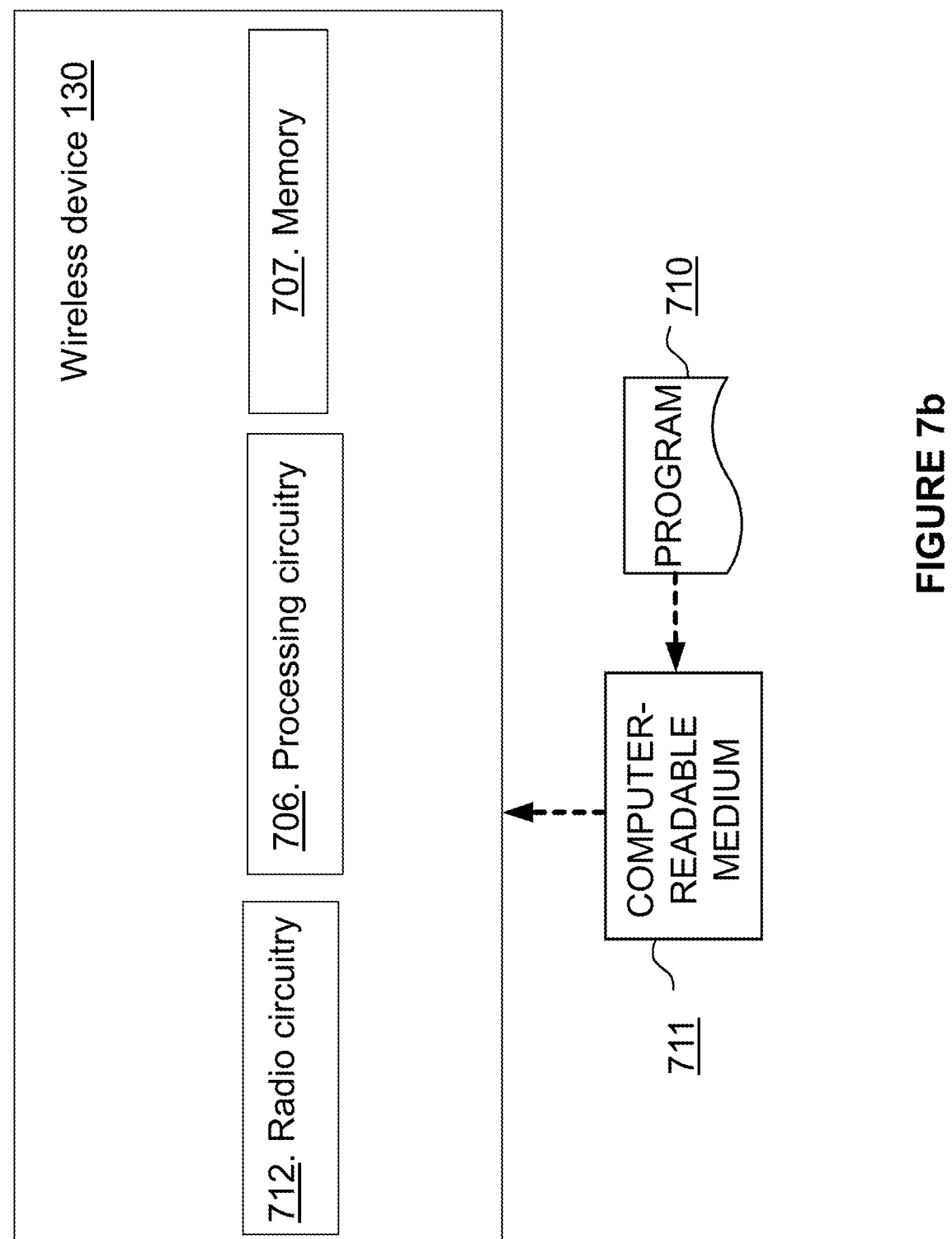

In other embodiments, the wireless device 130 may comprise the following arrangement depicted in FIG. 7b. The wireless device 130 may comprise a processing circuitry 706, e.g., one or more processors such as the processor 706, in the wireless device 130 and the memory 707. The wireless device 130 may also comprise a radio circuitry 712, which may comprise e.g., the receiving port 708 and the sending port 709. The processing circuitry 706 may be configured to, or operable to, perform the method actions according to FIG. 2, in a similar manner as that described in relation to FIG. 7a. The radio circuitry 712 may be configured to set up and maintain at least a wireless connection with the the first network node 111 and/or the second network node 112. Circuitry may be understood herein as a hardware component.

Hence, embodiments herein also relate to the wireless device 130 operative to handle a power of transmission, the wireless device 130 being operative to operate in the wireless communications network 100. The wireless device 130 may comprise the processing circuitry 706 and the memory 707, said memory 707 containing instructions executable by said processing circuitry 706, whereby the wireless device 130 is further operative to perform the actions described herein in relation to the wireless device 130, e.g., in FIG. 2.

Figure 8A:
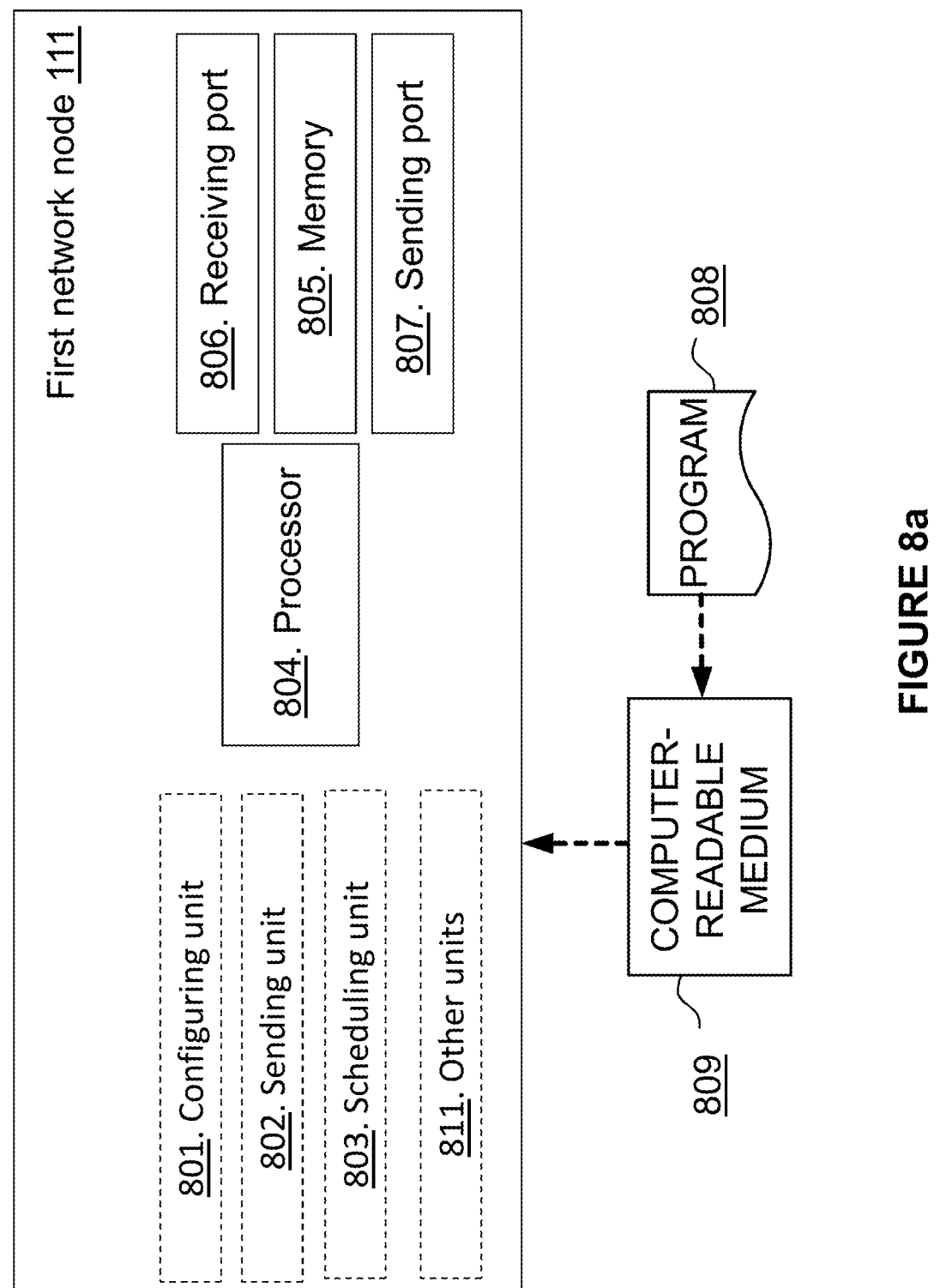
FIG. 8 is a schematic block diagram illustrating embodiments of a first network node, according to embodiments herein.

FIG. 8 depicts two different examples in panels a) and b), respectively, of the arrangement that the first network node 111 may comprise to perform the method actions described above in relation to FIG. 3. In some embodiments, the first network node 111 may comprise the following arrangement depicted in FIG. 8a.

The embodiments herein in the first network node 111 may be implemented through one or more processors, such as a processor 804 in the first network node 111 depicted in FIG. 8a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 805 comprising one or more memory units. The memory 805 is arranged to be used to store obtained information, store data, configurations, schedulings, and applications etc. to perform the methods herein when being executed in the first network node 111.

In some embodiments, the first network node 111 may receive information from, e.g., the second network node 112 and/or the wireless device 130, through a receiving port 806. In some embodiments, the receiving port 806 may be, for example, connected to one or more antennas in first network node 111. In other embodiments, the first network node 111 may receive information from another structure in the wireless communications network 100 through the receiving port 806. Since the receiving port 806 may be in communication with the processor 804, the receiving port 806 may then send the received information to the processor 804. The receiving port 806 may also be configured to receive other information.

The processor 804 in the first network node 111 may be further configured to transmit or send information to e.g., the second network node 112 and/or the wireless device 130, or another structure in the wireless communications network 100, through a sending port 807, which may be in communication with the processor 804, and the memory 805.

Those skilled in the art will also appreciate that the configuring unit 801, the sending unit 802, the scheduling unit 803 and the other units 811 described above may refer to a combination of analog and digital modules, and/or one or more processors configured with software and/or firmware, e.g., stored in memory, that, when executed by the one or more processors such as the processor 804, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 801-803 and 811 described above may be implemented as one or more applications running on one or more processors such as the processor 804.

Thus, the methods according to the embodiments described herein for the first network node 111 may be respectively implemented by means of a computer program 808 product, comprising instructions, i.e., software code portions, which, when executed on at least one processor 804, cause the at least one processor 804 to carry out the actions described herein, as performed by the first network node 111. The computer program 808 product may be stored on a computer-readable storage medium 809. The computer-readable storage medium 809, having stored thereon the computer program 808, may comprise instructions which, when executed on at least one processor 804, cause the at least one processor 804 to carry out the actions described herein, as performed by the first network node 111. In some embodiments, the computer-readable storage medium 809 may be a non-transitory computer-readable storage medium, such as a CD ROM disc, or a memory stick. In other embodiments, the computer program 808 product may be stored on a carrier containing the computer program 808 just described, wherein the carrier is one of an electronic signal, optical signal, radio signal, or the computer-readable storage medium 809, as described above.

The first network node 111 may comprise a communication interface configured to facilitate communications between the first network node 111 and other nodes or devices, e.g., the second network node 112 and/or the wireless device 130. The interface may, for example, include a transceiver configured to transmit and receive radio signals over an air interface in accordance with a suitable standard.

Figure 8B:
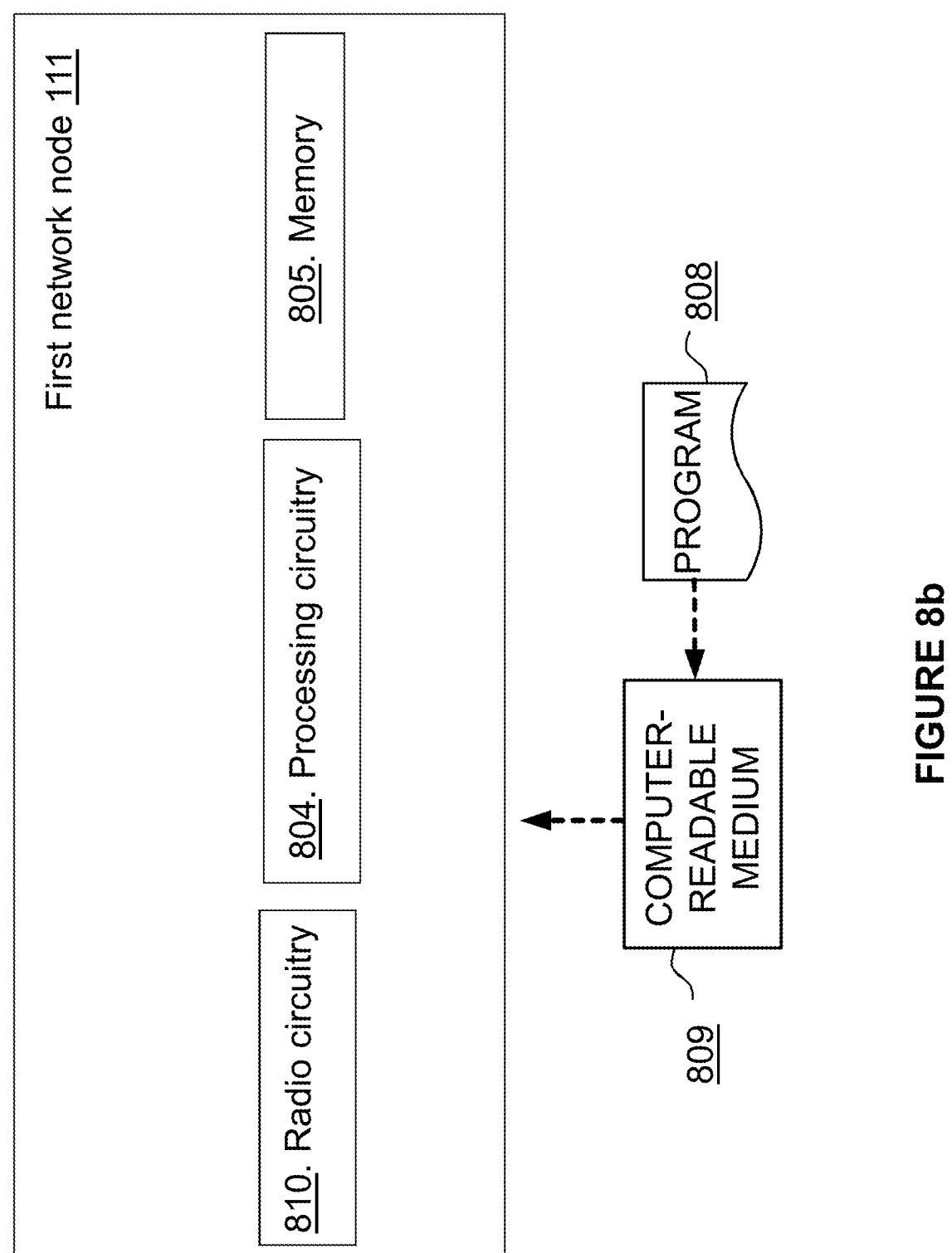

In other embodiments, the first network node 111 may comprise the following arrangement depicted in FIG. 8b. The first network node 111 may comprise a processing circuitry 804, e.g., one or more processors such as the processor 804, in the first network node 111 and the memory 805. The first network node 111 may also comprise a radio circuitry 810, which may comprise e.g., the receiving port 806 and the sending port 807. The processing circuitry 810 may be configured to, or operable to, perform the method actions according to FIG. 3, in a similar manner as that described in relation to FIG. 8a. The radio circuitry 810 may be configured to set up and maintain at least a wireless connection with the second network node 112 and/or the wireless device 130. Circuitry may be understood herein as a hardware component.

Hence, embodiments herein also relate to the first network node 111 comprising the processing circuitry 804 and the memory 805, said memory 805 containing instructions executable by said processing circuitry 804, whereby the first network node 111 is operative to perform the actions described herein in relation to the first network node 111, e.g., in FIG. 3.

Figure 9A:
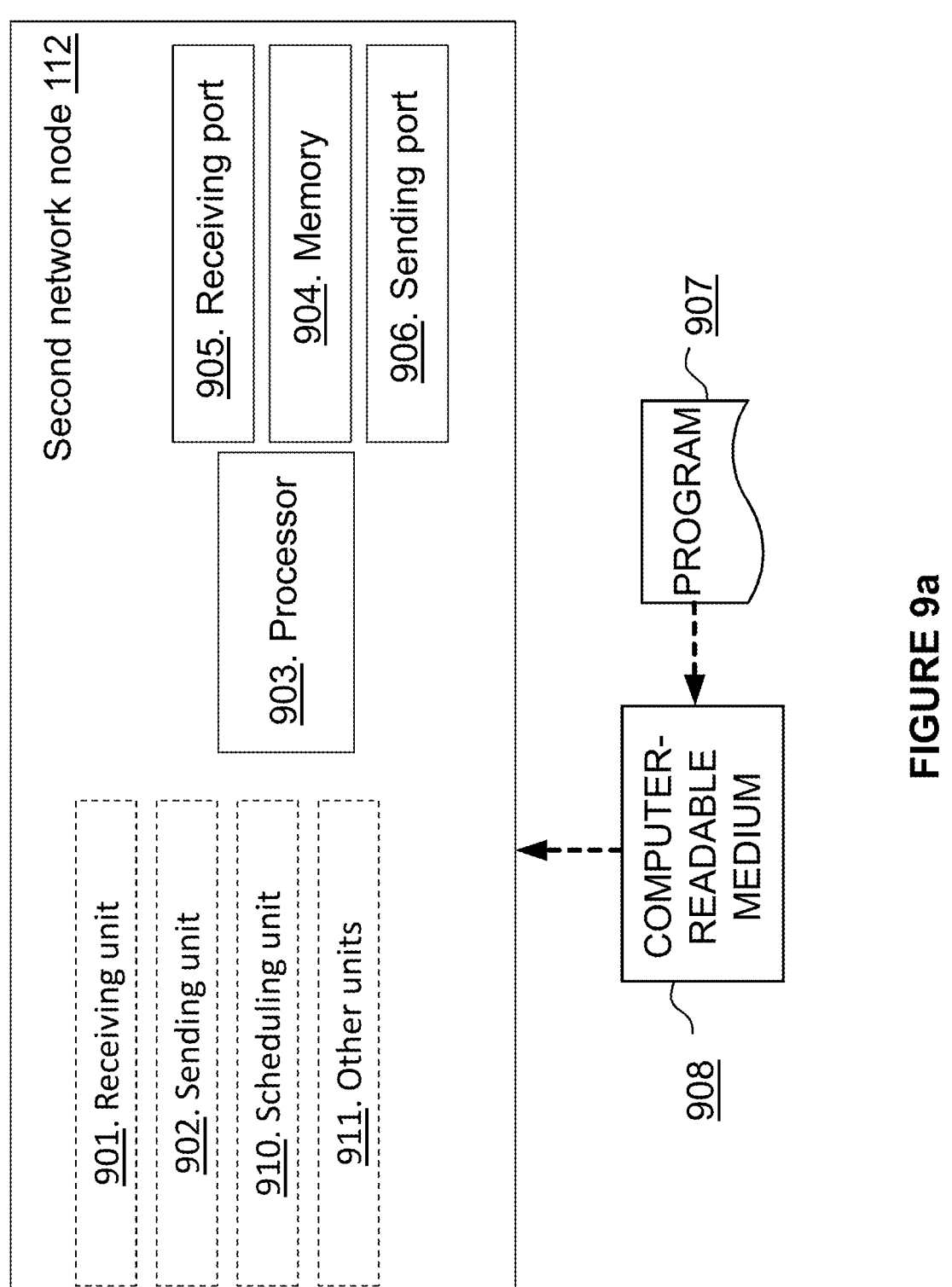
FIG. 9 is a schematic block diagram illustrating embodiments of a second network node, according to embodiments herein.

FIG. 9 depicts two different examples in panels a) and b), respectively, of the arrangement that the second network node 112 may comprise to perform the method actions described above in relation to FIG. 4. In some embodiments, the second network node 112 may comprise the following arrangement depicted in FIG. 9a.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first network node 111, and will thus not be repeated here.

In FIG. 9, optional modules are indicated with dashed boxes.

The embodiments herein in the second network node 112 may be implemented through one or more processors, such as a processor 903 in the second network node 112 depicted in FIG. 9a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 904 comprising one or more memory units. The memory 904 is arranged to be used to store obtained information, store data, configurations, schedulings, and applications etc. to perform the methods herein when being executed in the second network node 112.

In some embodiments, the second network node 112 may receive information from, e.g., the first network node 111 and/or the wireless device 130, through a receiving port 905. In some embodiments, the receiving port 905 may be, for example, connected to one or more antennas in second network node 112. In other embodiments, the second network node 112 may receive information from another structure in the wireless communications network 100 through the receiving port 905. Since the receiving port 905 may be in communication with the processor 903, the receiving port 905 may then send the received information to the processor 903. The receiving port 905 may also be configured to receive other information.

The processor 903 in the second network node 112 may be further configured to transmit or send information to e.g., the first network node 111 and/or the wireless device 130, or another structure in the wireless communications network 100, through a sending port 906, which may be in communication with the processor 903, and the memory 904.

Those skilled in the art will also appreciate that the receiving unit 901, the sending unit 902, the scheduling unit 910 and the other units 911 described above may refer to a combination of analog and digital modules, and/or one or more processors configured with software and/or firmware, e.g., stored in memory, that, when executed by the one or more processors such as the processor 903, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 901-902 and 910-911 described above may be implemented as one or more applications running on one or more processors such as the processor 903.

Thus, the methods according to the embodiments described herein for the second network node 112 may be respectively implemented by means of a computer program 907 product, comprising instructions, i.e., software code portions, which, when executed on at least one processor 903, cause the at least one processor 903 to carry out the actions described herein, as performed by the second network node 112. The computer program 907 product may be stored on a computer-readable storage medium 908. The computer-readable storage medium 908, having stored thereon the computer program 907, may comprise instructions which, when executed on at least one processor 903, cause the at least one processor 903 to carry out the actions described herein, as performed by the second network node 112. In some embodiments, the computer-readable storage medium 908 may be a non-transitory computer-readable storage medium, such as a CD ROM disc, or a memory stick. In other embodiments, the computer program 907 product may be stored on a carrier containing the computer program 907 just described, wherein the carrier is one of an electronic signal, optical signal, radio signal, or the computer-readable storage medium 908, as described above.

The second network node 112 may comprise a communication interface configured to facilitate communications between the second network node 112 and other nodes or devices, e.g., the second network node 112 and/or the wireless device 130. The interface may, for example, include a transceiver configured to transmit and receive radio signals over an air interface in accordance with a suitable standard.

Figure 9B:
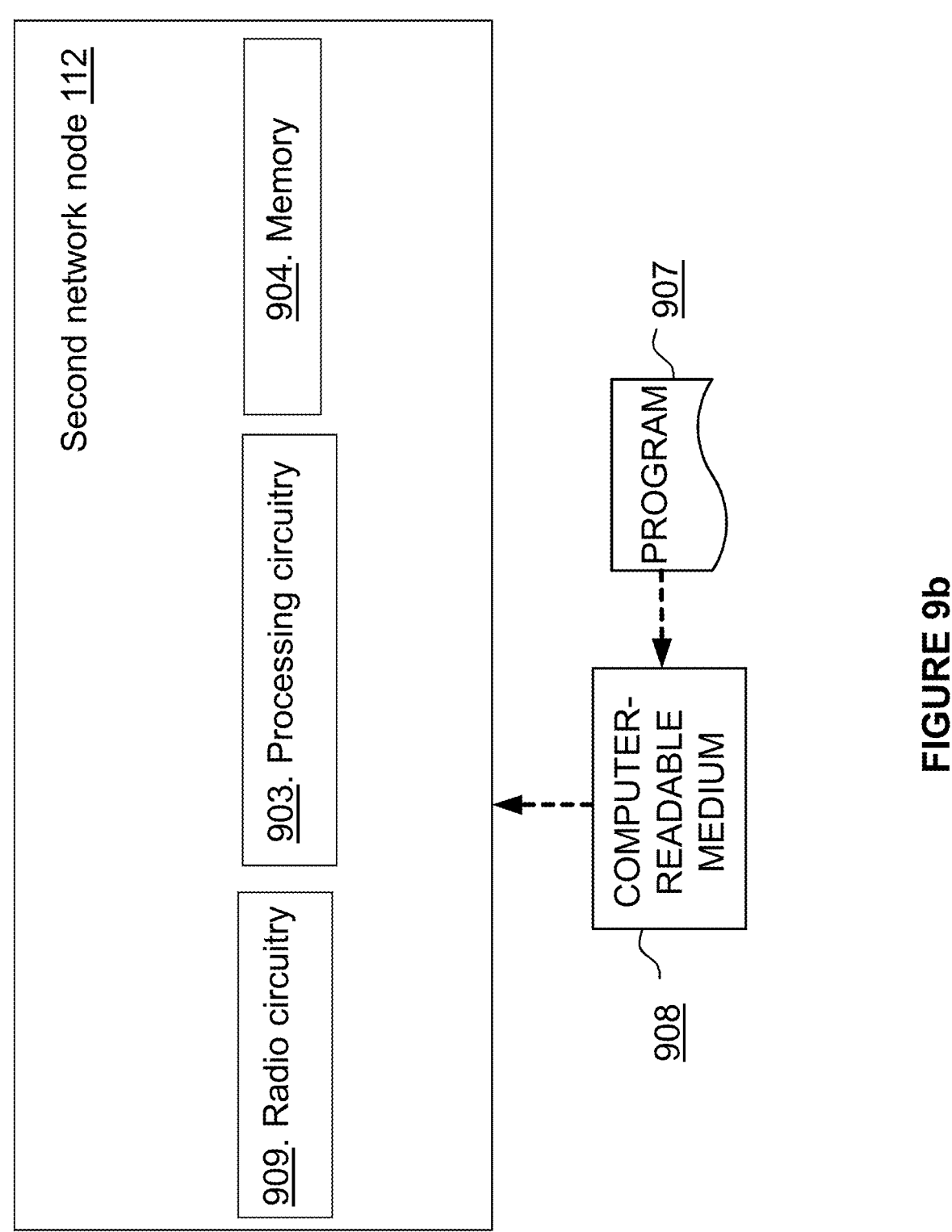

In other embodiments, the second network node 112 may comprise the following arrangement depicted in FIG. 9*b*. The second network node 112 may comprise a processing circuitry 903, e.g., one or more processors such as the processor 903, in the second network node 112 and the memory 904. The second network node 112 may also comprise a radio circuitry 909, which may comprise e.g., the receiving port 905 and the sending port 906. The processing circuitry 903 may be configured to, or operable to, perform the method actions according to FIG. 4, in a similar manner as that described in relation to FIG. 9*a*. The radio circuitry 909 may be configured to set up and maintain at least a wireless connection with the first network node 111 and/or the wireless device 130. Circuitry may be understood herein as a hardware component.

Hence, embodiments herein also relate to the second network node 112 comprising the processing circuitry 903 and the memory 904, said memory 904 containing instructions executable by said processing circuitry 903, whereby the second network node 112 is operative to perform the actions described herein in relation to the second network node 112, e.g., in FIG. 4.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Examples related to embodiments herein and further extensions and variations will now be described.

Figure 10:
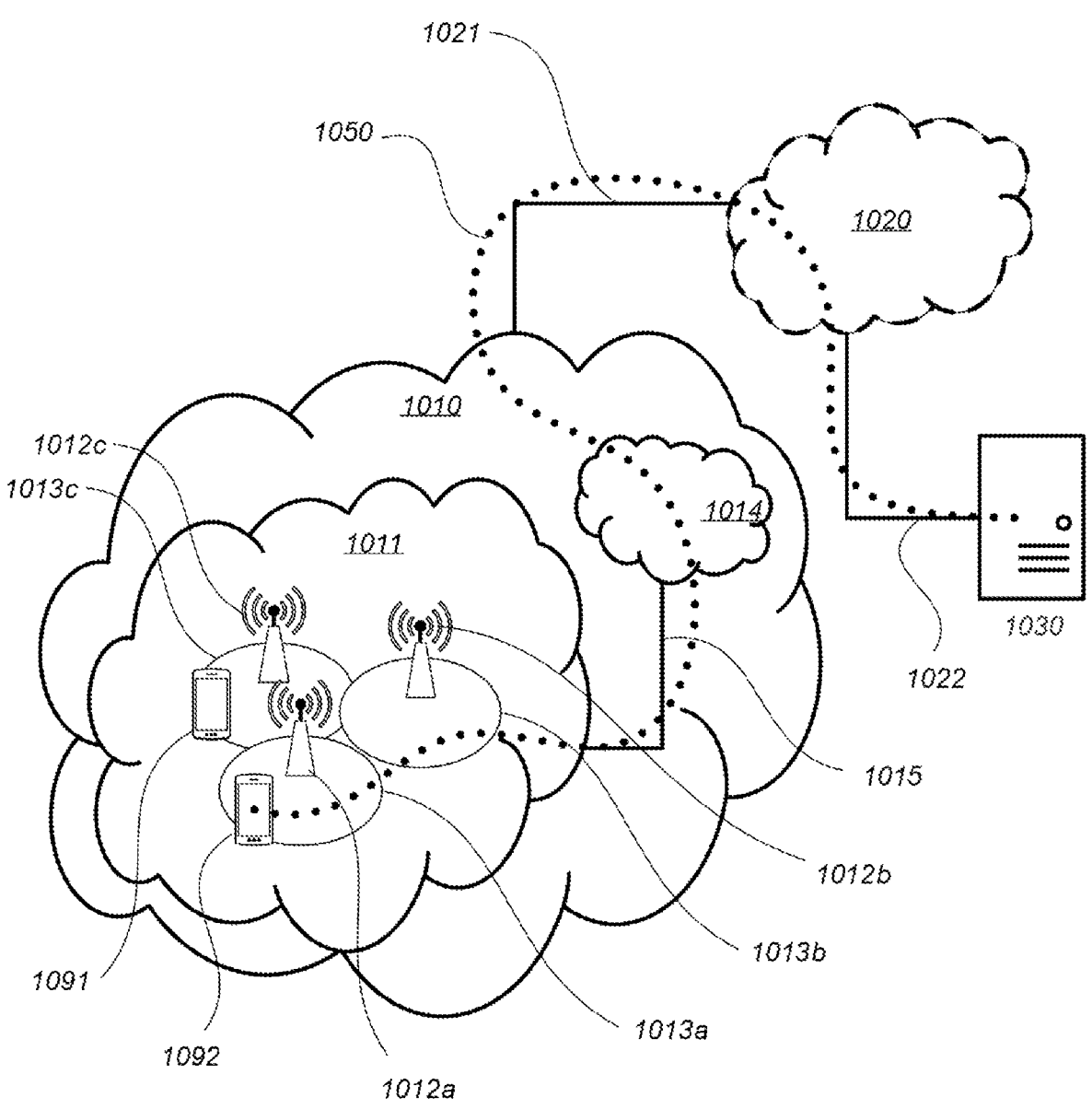
FIG. 10 is a schematic block diagram illustrating a telecommunication network connected via an intermediate network to a host computer, according to embodiments herein.

FIG. 10: Telecommunication network connected via an intermediate network to a host computer in accordance with some embodiments With reference to FIG. 10, in accordance with an embodiment, a communication system includes telecommunication network 1010 such as the wireless communications network 100, for example, a 3GPP-type cellular network, which comprises access network 1011, such as a radio access network, and core network 1014. Access network 1011 comprises a plurality of network nodes such as any of the first network node 111 and the second network node 112. For example, base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to core network 1014 over a wired or wireless connection 1015. A plurality of wireless devices, such as the wireless device 130 are comprised in the wireless communications network 100. In FIG. 10, a first UE 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012. Any of the UEs 1091, 1092 are examples of the wireless device 130.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

In relation to FIGS. 11, 12, 13, 14, and 15, which are described next, it may be understood that a UE is an example of the wireless device 130, and that any description provided for the UE equally applies to the wireless device 130. It may be also understood that the base station is an example of any of the first network node 111 and the second network node 112, and that any description provided for the base station equally applies to any of the first network node 111 and the second network node 112.

FIG. 11: Host computer communicating via a base station with a user equipment over a partially wireless connection in accordance with some embodiments Example implementations, in accordance with an embodiment, of the wireless device 130, e.g., a UE, the network node 110, e.g., a base station and host computer discussed in the preceding paragraphs will now be described with reference to FIG. 11. In communication system 1100, such as the wireless communications network 100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes any of the first network node 111 and the second network node 112, exemplified in FIG. 11 as a base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with the wireless device 130, exemplified in FIG. 11 as a UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012*a*, 1012*b*, 1012*c* and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the coverage and data rate, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

FIG. 12: Methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

FIG. 13: Methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figures 14, 15:
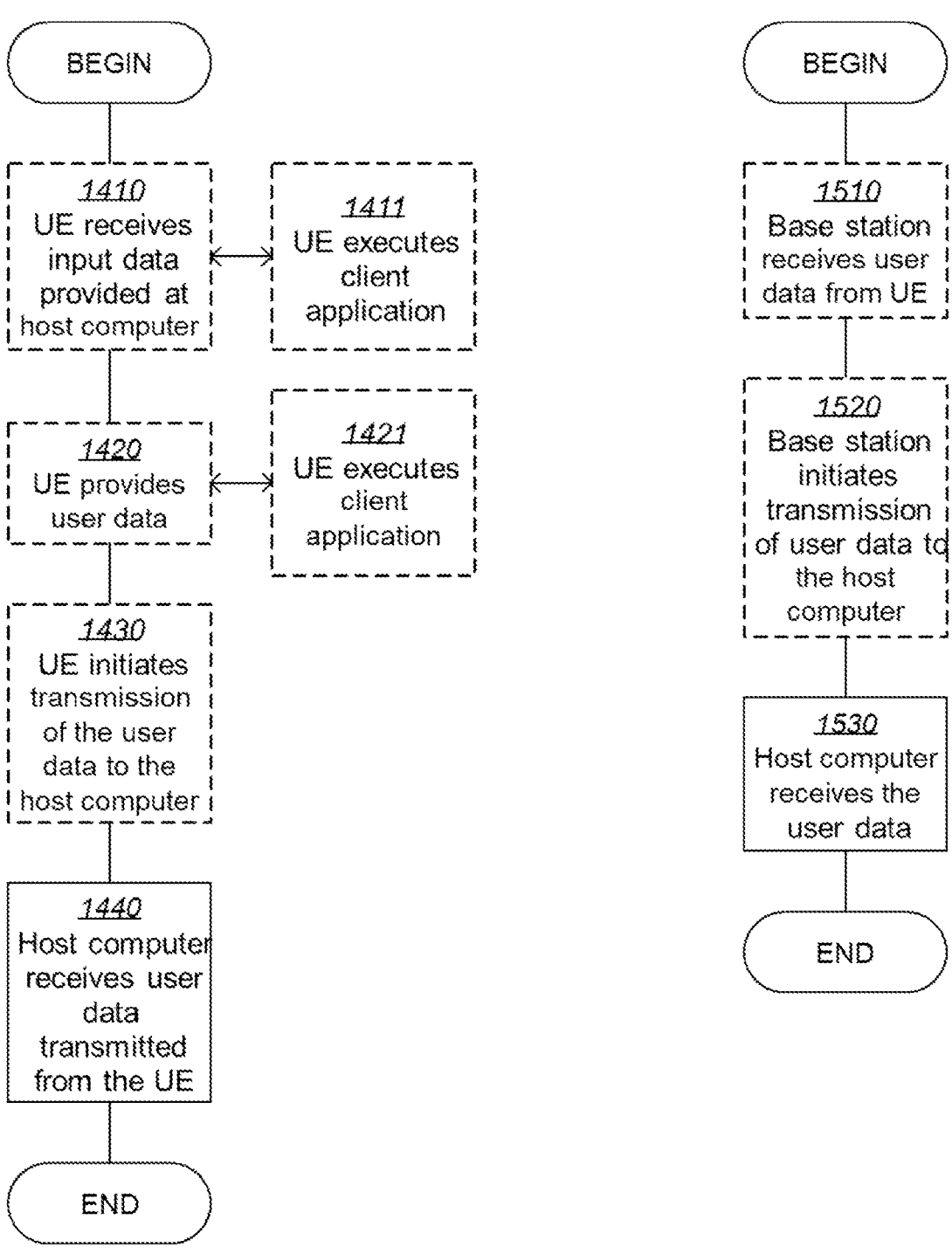
FIG. 14 is a flowchart depicting embodiments of a method in a communications system including a host computer, a base station and a user equipment, according to embodiments herein.
FIG. 15 is a flowchart depicting embodiments of a method in a communications system including a host computer, a base station and a user equipment, according to embodiments herein.

FIG. 14: Methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

FIG. 15: Methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further embodiments will now be described.

INTRODUCTION

In this document we discuss remaining issues related to specification of uplink power control for NR-DC and propose some corrections to TS 38.213.

DISCUSSION

Dynamic Power Sharing

RAN1 sent LS to RAN2 asking input related to UE capability signaling for $T_{offset}$ in [2] (see Annex A). The major concern with the WA in the LS is that MN is required to understand SCG configuration to properly use T-offset and RAN2 will be discussing this issue. In addition to above issue, following additional corrections are needed for specifying NR-DC dynamic power sharing Issue 1: Removing $T_{proc,CSI}$ There are values for capabilities defined with the only difference between them being the lack of $T_{proc,CSI}^{mux}$ in T-offset computation for $2^{nd}$ value compared to that in $1^{st}$ value. However, the values for $T_{proc,CSI}$ and Tmux,CSI seem to be not very different, with latter being just slightly bigger by 2 symbols in 15/30 kHz numerology.

$$Tproc,CSI{:}T_{proc,CSI}{=}(Z)(2048{+}144){\cdot}\kappa2^{-\mu}{\cdot}T_C,$$

$$T_{proc,CSI}^{max}{=}\max((Z{+}d){\cdot}(2048{+}144){\cdot}\kappa{\cdot}2^{-\mu}{\cdot}T_C,d_{2,2}),\quad \text{with}$$ $d{=}2$ for $\mu{=}0,1$, $d{=}3$ for $\mu{=}2$ and $d{=}4$ for $\mu{=}3$

|  | $T_{proc,\,CSI}$ | $T\hat{\ }mux\_proc,\,CSI$ |
|---|---|---|
| 15 kHz | 10 to 40 symbols (0.7 to 2.85 ms) | 12 to 42 symbols (0.85 to 3 ms) |
| 30 kHz | 13 to 72 symbols (0.46 to 2.57 ms) | 15 to 74 symbols (0.5 to 2.57 ms) |

Given the above, there is not sufficient distinction warranting two values for the capabilities—therefore, the working assumption should be updated to revise the second value for the capability. Two options—1) UE reports a numerical value (e.g in absolute ms), or 2) update the expression for the second value for the UE capability. Given RAN2 feedback is pending on the overall working assumption, it is proposed to revise the working assumption as per latter option.

---

Proposal 1: Adopt following TP1 for 38.213

---

--------------------------- start TP1 to sub clause 7.6.2 of 38.213v16.1.0 ---------------------
-
<.. unchanged text omitted >
If aUE
   - is provided NR-DC-PC-mode = Dynamic, and
   - indicates a capability to determine a total transmission power on the SCG at a first symbol
      of a transmission occasion on the SCG by determining transmissions on the MCG that
      -       are scheduled by DCI formats in PDCCH receptions with a last symbol that is earlier
              by more than $T_{offset}$ from the first symbol of the transmission occasion on the SCG, and
      -       overlap with the transmission occasion on the SCG
the UE determines a maximum transmission power on the SCG at the beginning of the transmission occasion on the SCG as
   - $\min(\hat{P}_{SCG},\ \hat{P}_{Total}^{NR\text{-}DC} - \hat{P}_{MCG}^{actual})$, if the UE determines transmissions on the MCG with a $\hat{P}_{MCG}^{actual}$ total power
   - $\hat{P}_{Total}^{NR\text{-}DC}$, if the UE does not determine any transmissions on the MCG
where
   - $T_{offset} = \max\{T_{proc,MCG}^{max},\ T_{proc,SCG}^{max}\}$,
   - $T_{proc,MCG}^{max}$ and $T_{proc,SCG}^{max}$ is the maximum of $T_{proc,2}$, $T_{proc,CSI}$, $T_{proc,release}^{mux}$, $T_{proc,2}^{mux}$, and $T_{proc,CSI}^{mux}$ based on the configurations on the MCG and the SCG, respectively, when the UE indicates a first value for the capability, and
   - $T_{proc,MCG}^{max}$ and $T_{proc,SCG}^{max}$ is the maximum of $T_{proc,2}$, $T_{proc,release}^{mux}$, $T_{proc,2}^{mux}$ based on the configurations on the MCG and the SCG, respectively, when the UE indicates a second value for the capability.
The UE does not expect to have transmissions on the MCG that
   - are scheduled by DCI formats in PDCCH receptions with a last symbol that is earlier by less than or equal to $T_{offset}$ from the first symbol of the transmission occasion on the SCG, and
   - overlap with the transmission occasion on the SCG
--------------------------- endTP1 --------------------------------------------------------------

Issue 2: Handling of TPC Commands in DCI Format 2-2, 2-3

The UE does not expect to have transmissions on the MCG that are scheduled by DCI formats in PDCCH receptions with a last symbol that is earlier by less than or equal to Toffetfrom the first symbol of the transmission occasion on the SCG, and overlap with the transmission occasion on the SCG Above text was added to 38.213 so that, to compute the transmit power for an SCG transmission, UE need not consider MCG grants assignments received within time T0-T-offset from the start of the SCG transmission at time T0. However, the text does not cover the possibility of UE receiving a TPC command on MCG within T0-T-offset that can change power of a MCG transmission overlapping with the SCG transmission and consequently requires power adjustment for the SCG transmission. This can happen for example when there is an overlapping MCG transmission triggered by a configured grant, and a DCI format 2_2 based TPC command is received by the UE between time T0-T-offset and T0.

We propose below TP2 to address the above issue above alternate formulation results in NW scheduling restriction for sending DCI 2-2, 2-3 based power adjustments to other UEs.

CONCLUSIONS

In this document, we discuss the framework for NR-NR DC power control and propose to agree to TP1 ans TP2 discussed in section 2.

Annex A

RAN1 WA from RAN1 #100-e

Update the previous agreement as follows (changes in red):

Agreements:

For NR-DC dynamic power sharing, to compute the transmit power for SCG UL transmission starting at time T0, UE checks for PDCCH(s) received before time T0-T_offset that trigger an overlapping MCG UL transmission, and If such PDCCH(s) are detected, UE sets it's transmit power in SCG (pwr_SCG) such that

---

Proposal 2: Adopt following TP2 for 38.213

---

-------------------------- start TP2 to sub clause 7.6.2 of 38.213v16.1.0 ---------------------------

<.. unchanged text omitted >

If aUE

-    is provided NR-DC-PC-mode = Dynamic, and

-    indicates a capability to determine a total transmission power on the SCG at a first symbol of a transmission occasion on the SCG by determining transmissions on the MCG that

-    are scheduled by DCI formats in PDCCH receptions with a last symbol that is earlier by more than $T_{offset}$ from the first symbol of the transmission occasion on the SCG, and

-    overlap with the transmission occasion on the SCG the UE determines a maximum transmission power on the SCG at the beginning of the transmission occasion on the SCG as

-    $\min(\hat{P}_{SCG}, \hat{P}_{Total}^{NR-DC} - \hat{P}_{MCG}^{actual})$, if the UE determines transmissions on the MCG with a $\hat{P}_{MCG}^{actual}$ total power

-    $\hat{P}_{Total}^{NR-DC}$ if the UE does not determine any transmissions on the MCG where

-    $T_{offset} = \max \{T_{proc,MCG}^{max}, T_{proc,SCG}^{max}\}$,

-    $T_{proc,CSI}^{max}$ and $T_{proc,SCG}^{max}$ is the maximum of $T_{proc,2}, T_{proc,CSI}, T_{proc,release}^{max}, T_{proc,2}^{max}$, and $T_{proc,CSI}^{max}$ based on the configurations on the MCG and the SCG, respectively, when the UE indicates a first value for the capability, and

-    $T_{proc,MCG}^{max}$ and $T_{proc,SCG}^{max}$ is the maximum of $T_{proc,2}, T_{proc,CSI}, T_{proc,release}^{max}, T_{proc,2}^{max}$ based on the configurations on the MCG and the SCG, respectively, when the UE indicates a second value for the capability.

The UE does not expect to have transmissions on the MCG that

-    are scheduled by DCI formats in PDCCH receptions with a last symbol that is earlier by less than or equal to $T_{offset}$ from the first symbol of the transmission occasion on the SCG, and

- overlap with the transmission occasion on the SCG

If the UE has a transmission on MCG that overlaps with the transmission occasion on the SCG, for adjusting the transmission power of the MCG transmission, the UE shall only consider TPC commands that are provided by DCI format 2-2, 2-3 in PDCCH receptions with a last symbol that is earlier by less than or equal to $T_{offset}$ from the first symbol of the transmission occasion on the SCG.

-------------------------- end TP2 --------------------------------------------------------------------------------

---

Another alternative to TP2 is as follows

"If the UE has a transmission on MCG that overlaps with the transmission occasion on the SCG, the UE does not expect to receive TPC commands to adjust the transmit power of MCG transmission that are provided by DCI format 2-2, 2-3 in PDCCH receptions with a last symbol that is earlier by less than or equal to $T_{offset}$ from the first symbol of the transmission occasion on the SCG."

We prefer the formulation in TP2, since DCI format 2-2 and 2-3 contain TPC commands for a group of UEs and the pwr_SCG<=min$\{P_{SCG}, P_{total}$–MCG tx power$\}$ where 'MCG tx power' is the actual transmission power of MCG Otherwise, pwr_SCG<=$P_{total}$;

UE does not expect to be scheduled by PDCCH(s) received on MCG after T0-[T_offset] that trigger(s) MCG UL transmission(s) that overlaps with the SCG transmission.

(working assumption) No new RRC signaling is introduced for T_offset:

Alt.1:    T_offset=max    $\{T_{proc,MCG}^{max}, T_{proc,SCG}^{max},\}$, where:

$T_{proc,MCG}{}^{max}$ is the maximum UE processing time among any of the possible values from $T_{proc,2}$, $T_{proc,CSI}$, $T_{proc,release}{}^{mux}$, $T_{proc,2}{}^{mux}$, and/or $T_{proc,CSI}{}^{mux}$ as specified in TS38.213 and TS38.214 based on the configurations for the MCG.

$T_{proc,SCG}{}^{max}$ is the maximum UE processing time among any of the possible values from $T_{proc,2}$, $T_{proc,CSI}$, $T_{proc,release}{}^{mux}$, $T_{proc,2}{}^{mux}$, and/or $T_{proc,CSI}{}^{mux}$ as specified in TS38.213 and TS38.214 based on the configurations for the SCG.

This is the "DPS without look-ahead".

Alt.2: $T\_offset = \max\{T_{proc,MCG}{}^{max}, T_{proc,SCG}{}^{max}, \}$, where:

$T_{proc,MCG}{}^{max}$ is the maximum UE processing time among any of the possible values from $T_{proc,2}$, $T_{proc,CSI}$, $T_{proc,release}{}^{mux}$ and/or $T_{proc,2}{}^{mux}$, as specified in TS38.213 and TS38.214 based on the configurations for the MCG.

$T_{proc,SCG}{}^{max}$ is the maximum UE processing time among any of the possible values from $T_{proc,2}$, $T_{proc,CSI}$, $T_{proc,release}{}^{mux}$ and/or $T_{proc,2}{}^{mux}$, as specified in TS38.213 and TS38.214 based on the configurations for the SCG.

This is the "DPS with look-ahead".

A UE reports the UE capability of Alt.1 and/or Alt.2.

Details up to UE feature list discussion

Abbreviations

At least some of the following abbreviations may be used in this disclosure. If there is an inconsistency between abbreviations, preference should be given to how it is used above. If listed multiple times below, the first listing should be preferred over any subsequent listing(s).

CDM Code Division Multiplex
CQI Channel Quality Information
CRC Cyclic Redundancy Check
DCI Downlink Control Information
DFT Discrete Fourier Transform
DM-RS Demodulation Reference Signal
FDM Frequency Division Multiplex
HARQ Hybrid Automatic Repeat Request
OFDM Orthogonal Frequency Division Multiplex
PAPR Peak to Average Power Ratio
PUCCH Physical Uplink Control Channel
PUSCH Physical Uplink Shared Channel
SRS Sounding Reference Signal
PRACH Physical Random Access Channel
DC Dual-connectivity
PRB Physical Resource Block
RRC Radio Resource Control
UCI Uplink Control Information
EIRP Effective Isotropic Radiated Power
SS-block Synchronisation Signal Block
CSI-RS Channel State Information Reference Signal
PBCH Primary Broadcast Channel
MSG Master Cell Group
SCG Secondary Cell Group Claims are provided below. Reference numbers/letters are provided in parenthesis by way of example/illustration without limiting claims to particular elements indicated by reference numbers/letters.

The invention claimed is:

1. A method performed by a wireless device configured with dual connectivity between a second cell group (SCG) and a master cell group (MCG), the method comprising:

determining a limit of a power of transmission of a first uplink transmission in the SCG, wherein the limit is determined based on a detection, before a time offset in relation to a beginning of a time of transmission of the first uplink transmission, of a downlink grant or assignment that triggers a second uplink transmission in the MCG that would overlap in time with the first uplink transmission, wherein the time offset is based on a capability indicated by the wireless device to determine a total transmission power on the SCG at a first symbol of a transmission occasion on the SCG and wherein the time offset is calculated dependent on a channel state information (CSI) processing time if the wireless device indicates a first value for the capability and the time offset is calculated independent of the CSI processing time if the wireless device indicates a second value for the capability, and wherein a power of the second uplink transmission is determined by transmit power control (TPC) commands received before a deadline that is based on the time offset and a delta value, the delta value depending on whether the dual connectivity is synchronous or asynchronous; and setting the power of transmission for the first uplink transmission based on the limit.

2. The method of claim 1, wherein the wireless device indicates a first value for the capability and the time offset is obtained from processing times which comprise at least a certain subset of processing times related to channel information state, CSI, processing; and when the wireless device indicates a second value for the capability the time offset is obtained from processing times which do not comprise processing times related to CSI processing.

3. The method of claim 1, wherein the time offset obtained from processing times which comprise at least a certain subset of processing times related to CSI processing is shorter than time offset obtained from processing times which do not comprise processing times related to CSI processing.

4. The method of claim 1, wherein the power of the second uplink transmission is determined by transmit power control, TPC, commands received before the time offset.

5. The method of claim 1, wherein TPC commands received after the time offset and a delta value in relation to a beginning of a time of transmission of the first uplink transmission are discarded when computing the transmit power of the second uplink transmission, where the delta value is depending on whether dual connectivity is synchronous or asynchronous.

6. The method of claim 1, wherein TPC commands received after the time offset and a delta value in relation to a beginning of a time of transmission of the first uplink transmission are applied to the second uplink transmission received after beginning of a time of transmission of the first uplink transmission, where the delta value is depending on whether dual connectivity is synchronous or asynchronous.

7. A wireless device comprising:

at least one processor; and at least one memory storing instructions executable by the at least one processor to perform operations to:

determine a limit of a power of transmission of a first uplink transmission in a second cell group (SCG) wherein the limit is determined based on a detection, before a time offset in relation to a beginning of a time of transmission of the first uplink transmission, of a downlink grant or assignment that triggers a second uplink transmission in a master cell group (MCG) that would overlap in time with the first uplink transmission, wherein the time offset is based on a capability indicated by the wireless device to determine a total transmission power on the SCG at a first symbol of a transmission occasion on the SCG and wherein the time offset is calculated dependent on a channel information state (CSI) processing time if the wireless device indicates a first value for the capability and the time offset is calculated independent of the CSI processing time if the wireless device indicates a second value for the capability, and wherein a power of the second uplink transmission is determined by transmit power control (TPC) commands received before a deadline that is based on the time offset and a delta value, the delta value depending on whether the dual connectivity is synchronous or asynchronous; and set the power of transmission for the first uplink transmission based on the limit.

8. A computer program product comprising a non-transitory storage medium storing program code to be executed by processing circuitry of a wireless device, whereby execution of the program code causes the wireless device to perform operations to:

determine a limit of a power of transmission of a first uplink transmission in second cell group (SCG) wherein the limit is determined based on a detection, before a time offset in relation to a beginning of a time of transmission of the first uplink transmission, of a downlink grant or assignment that triggers a second uplink transmission in a master cell group (MCG) that would overlap in time with the first uplink transmission, wherein the time offset is based on a capability indicated by the wireless device to determine a total transmission power on the SCG at a first symbol of a transmission occasion on the SCG and wherein the time offset is calculated dependent on a channel state information (CSI) processing time if the wireless device indicates a first value for the capability and the time offset is calculated independent of the CSI processing time if the wireless device indicates a second value for the capability, and wherein a power of the second uplink transmission is determined by transmit power control (TPC) commands received before a deadline that is based on the time offset and a delta value, the delta value depending on whether the dual connectivity is synchronous or asynchronous; and set the power of transmission for the first uplink transmission based on the limit.

* * * * *